(12) United States Patent
Muhs

(10) Patent No.: US 7,011,505 B2
(45) Date of Patent: Mar. 14, 2006

(54) PUMP SYSTEM WITH VACUUM SOURCE

(75) Inventor: David Muhs, Minnetonka, MN (US)

(73) Assignee: Water Management Systems, Minnetonka, MN (US)

(*) Notice: Subject to any disclaimer, the term of this patent is extended or adjusted under 35 U.S.C. 154(b) by 68 days.

(21) Appl. No.: 10/732,769

(22) Filed: Dec. 10, 2003

(65) Prior Publication Data
US 2004/0120828 A1 Jun. 24, 2004

Related U.S. Application Data

(60) Continuation of application No. 10/099,810, filed on Mar. 15, 2002, now Pat. No. 6,692,234, which is a continuation-in-part of application No. 09/907,193, filed on Jul. 17, 2001, now Pat. No. 6,585,492, which is a division of application No. 09/531,631, filed on Mar. 21, 2000, now Pat. No. 6,315,524.

(60) Provisional application No. 60/125,559, filed on Mar. 22, 1999.

(51) Int. Cl.
F04D 9/00 (2006.01)
F04B 17/00 (2006.01)
B67D 5/56 (2006.01)

(52) U.S. Cl. .................. 417/200; 417/435; 137/565.34

(58) Field of Classification Search ................ 417/200, 417/211.5, 63, 199.2, 435, 306, 290; 137/565.7, 137/565.34, 558, 205
See application file for complete search history.

(56) References Cited

U.S. PATENT DOCUMENTS

| | | | |
|---|---|---|---|
| 640,345 A | 1/1900 | Wilberforce | |
| 1,555,023 A | 9/1925 | Prokofieff | |
| 1,735,754 A | 11/1929 | Hargis | |
| 1,763,595 A | 6/1930 | Paatsch | |
| 1,840,257 A | 1/1932 | Saxe et al. | |
| 1,891,267 A | 12/1932 | Milkowski | |
| 2,033,980 A * | 3/1936 | Durdin, Jr. .................. 417/200 |
| 2,306,988 A | 12/1942 | Adams | |
| 3,035,781 A | 5/1962 | Wallen | |
| 3,272,137 A | 9/1966 | Maitlen et al. | |
| 3,394,772 A | 7/1968 | Abold | |
| 3,522,997 A | 8/1970 | Rylewski | |

(Continued)

FOREIGN PATENT DOCUMENTS

DE 573029 3/1933

(Continued)

OTHER PUBLICATIONS

Hidrostal, Sectional Drawings Q-Hydralic, 1 page, dated Sep. 19, 1994.

(Continued)

Primary Examiner—Timothy P. Solak
(74) Attorney, Agent, or Firm—Crompton Seager Tufte

(57) ABSTRACT

A self priming pump system that includes a motor coupled to a centrifugal pump for driving the centrifugal pump. A separator having a reservoir is provided for storing a limited amount of pumped fluid in advance of the centrifugal pump. A vacuum source provides a vacuum suction to the reservoir to draw pumped fluid into the reservoir to prime the pump. To increase the reliability of the vacuum pump system, a deflector and/or extension may be provided in the reservoir to help prevent pumped fluid from entering the vacuum pump input. Also, the configuration of a tank used to store liquid for the vacuum pump system may be configured to separate and collect sediments near a drain port, which then can be easily drained. For positive head pressures, one or more valves may be used to prevent pumped fluid from escaping the reservoir, if desired.

21 Claims, 32 Drawing Sheets

U.S. PATENT DOCUMENTS

| | | |
|---|---|---|
| 3,543,368 A | 12/1970 | Marlow |
| 3,584,974 A | 6/1971 | Nicastro |
| 3,610,780 A | 10/1971 | Smith |
| 3,644,056 A | 2/1972 | Wiselius |
| 3,644,061 A | 2/1972 | McFarlin |
| 3,712,764 A | 1/1973 | Shearwood |
| 3,771,900 A | 11/1973 | Baehr |
| 3,867,070 A | 2/1975 | Sloan |
| 4,019,680 A | 4/1977 | Norris |
| 4,057,368 A | 11/1977 | Balling |
| 4,067,663 A | 1/1978 | Brooks et al. |
| 4,080,096 A | 3/1978 | Dawson |
| 4,116,582 A * | 9/1978 | Sloan .................... 415/175 |
| 4,146,353 A | 3/1979 | Carrouset |
| 4,183,721 A | 1/1980 | Peterson |
| 4,386,886 A | 6/1983 | Neal |
| 4,402,648 A | 9/1983 | Kretschmer |
| 4,427,336 A | 1/1984 | Lake |
| 4,443,158 A | 4/1984 | Bentele et al. |
| 4,498,844 A | 2/1985 | Bissell et al. |
| 4,515,180 A | 5/1985 | Napolitano |
| 4,606,704 A | 8/1986 | Sloan |
| 4,637,780 A | 1/1987 | Grayden |
| 4,648,796 A | 3/1987 | Maghenzani |
| 4,687,412 A | 8/1987 | Chamberlain |
| 4,708,585 A | 11/1987 | Fukazawa et al. |
| 4,737,073 A | 4/1988 | Grayden |
| 4,762,465 A | 8/1988 | Friedrichs |
| 4,781,529 A | 11/1988 | Rose |
| 4,881,614 A | 11/1989 | Hoshi et al. |
| 4,902,199 A | 2/1990 | McDonald et al. |
| 4,940,402 A | 7/1990 | McCormick |
| 4,946,349 A | 8/1990 | Manabe et al. |
| 4,973,993 A * | 11/1990 | Allen ............................ 347/7 |
| 4,981,413 A | 1/1991 | Elonen et al. |
| 4,989,572 A | 2/1991 | Giacomazzi et al. |
| 4,992,028 A | 2/1991 | Schoenwald et al. |
| 5,078,169 A | 1/1992 | Scheurenbrand et al. |
| 5,078,573 A | 1/1992 | Peroaho et al. |
| 5,114,312 A | 5/1992 | Stanislao |
| 5,203,677 A * | 4/1993 | Lix et al. ..................... 417/12 |
| 5,242,268 A | 9/1993 | Fukazawa et al. |
| 5,328,274 A | 7/1994 | Wallace et al. |
| 5,380,042 A | 1/1995 | Hively et al. |
| 5,464,329 A | 11/1995 | Senoo et al. |
| 5,487,644 A | 1/1996 | Ishigaki et al. |
| 5,489,195 A | 2/1996 | Domagalla et al. |
| 5,536,147 A | 7/1996 | Lang |
| 5,542,822 A | 8/1996 | Stretz et al. |
| 5,580,222 A | 12/1996 | Bornemann |
| 5,588,806 A | 12/1996 | Trimborn et al. |
| 5,641,271 A | 6/1997 | Forrester et al. |
| 5,660,533 A | 8/1997 | Cartwright |
| 5,673,940 A | 10/1997 | Gaisford et al. |
| 5,797,377 A | 8/1998 | Fischerkeller |
| 5,797,724 A | 8/1998 | Liu et al. |
| 5,800,146 A | 9/1998 | Junemann et al. |
| 5,807,067 A | 9/1998 | Burdick |
| 5,846,420 A | 12/1998 | Bolton et al. |
| 5,944,216 A | 8/1999 | Inaoka et al. |
| 5,960,981 A | 10/1999 | Dodson et al. |
| 5,997,242 A | 12/1999 | Hecker et al. |
| 6,158,959 A | 12/2000 | Arbeus |
| 6,315,524 B1 | 11/2001 | Muhs et al. |
| 6,409,478 B1 | 6/2002 | Carnes et al. |
| 6,585,492 B1 | 7/2003 | Muhs et al. |
| 6,692,234 B1 | 2/2004 | Muhs |

FOREIGN PATENT DOCUMENTS

| | | |
|---|---|---|
| DE | 694694 | 8/1940 |
| DE | 2440905 | 3/1976 |
| DE | 3040160 | 6/1982 |
| EP | 0606154 | 7/1994 |
| FR | 1468696 | 2/1967 |
| FR | 2748526 | 11/1997 |
| GB | 2181487 | 4/1987 |
| GB | 2 303 178 * | 2/1997 |
| GB | 2303178 | 2/1997 |
| WO | WO 93/01396 | 1/1993 |
| WO | WO 98/16403 | 4/1998 |

OTHER PUBLICATIONS

Godwin Pumps, Dri-Prime Contractors Pumps brochure, 4 pages, dated prior to Mar. 22, 1999.

SPP Pumps Ltd., Hydrostream Horizontal Split Case Pumps brochure, 6 pages, dated prior to Mar. 22, 1999.

SPP Pumps Ltd., Literature Folio, 96 pages, dated prior to Mar. 22, 1999.

Source unknown, "Principles of Operation", p. 2, dated prior to Mar. 22, 1999.

Source unknown, Pumping of Liquids and Gases, pp. 6-24, dated prior to Mar. 22, 1999.

Parma Pompe, Omega.S brochure, 8 pages, dated prior to Mar. 22, 1999.

Neyrtec—Alstrhom ATlantique: "Hydro Vakuumpumpen und—verdichter der Reihen NS-CNS,"S.A. IMP. Boissy & COL0MB., Grenoble XP002253993, Jul. 1979 (No English translation. The article is relevant because it was cited on the Supplementary European Search Report).

W.H. Faragallah: "Liquid ring vacuum pumps and compressors," 1986, Beltz Offsetdruck, 6944 Hemsbach/Bergstrasse XP002253992, p. 77, paragraph 5.2.2, pp. 78, figure 5.4.

* cited by examiner

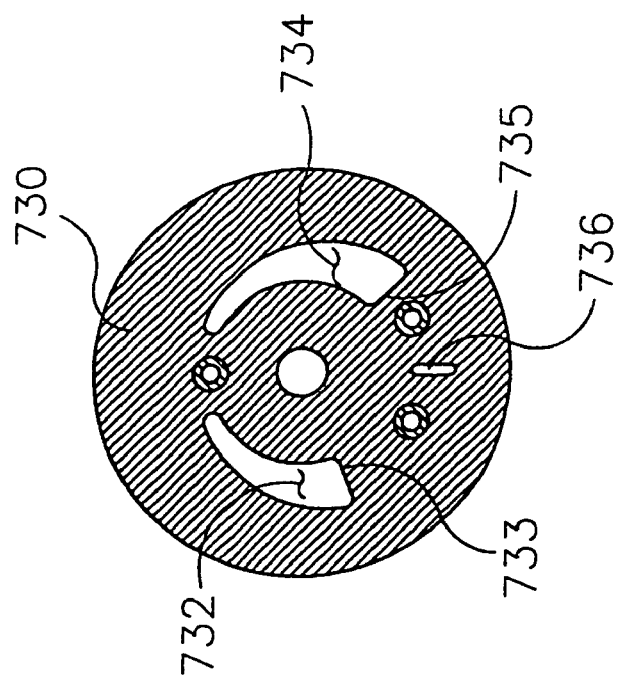
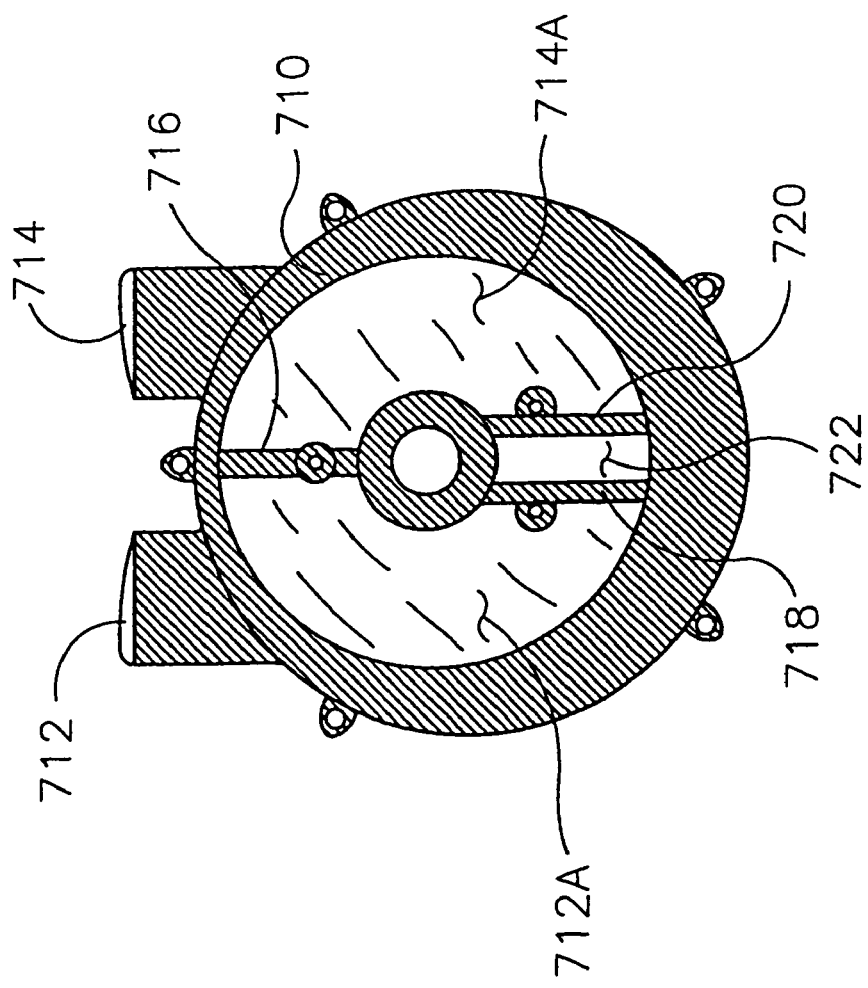
FIG. 13
FIG. 12

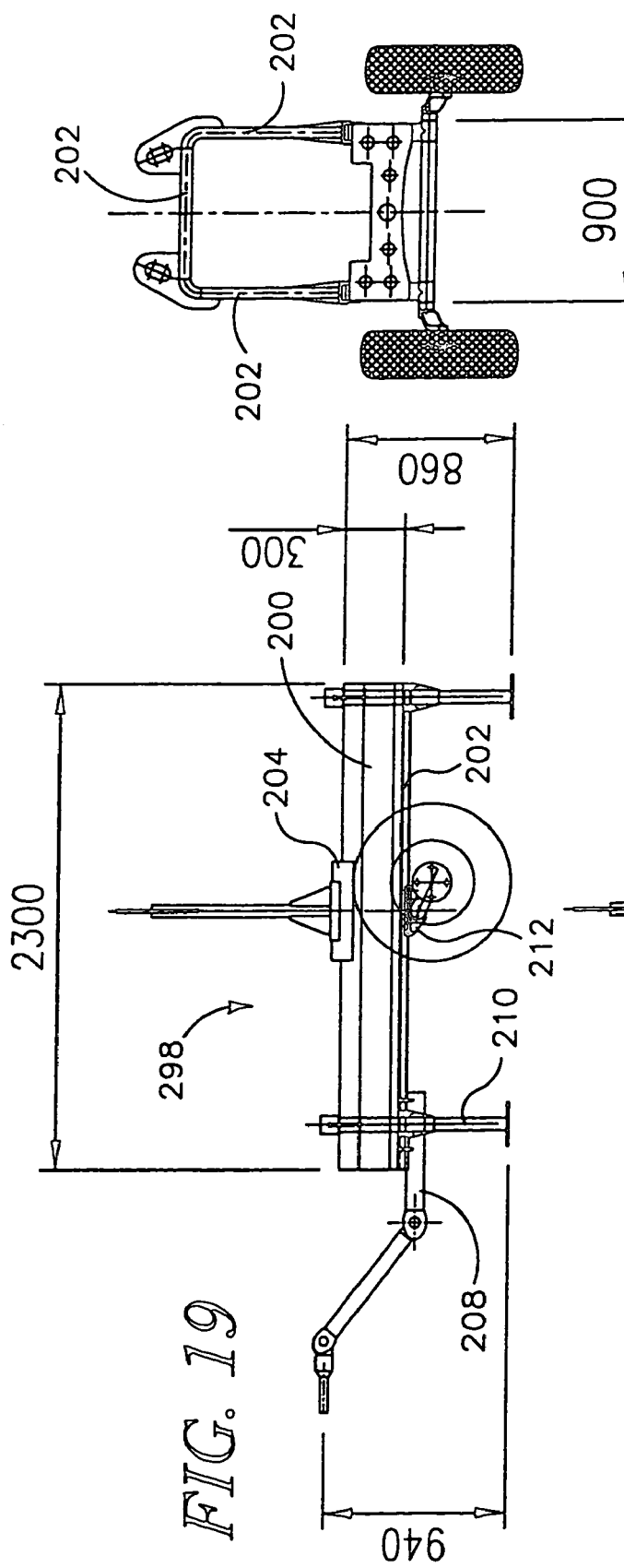
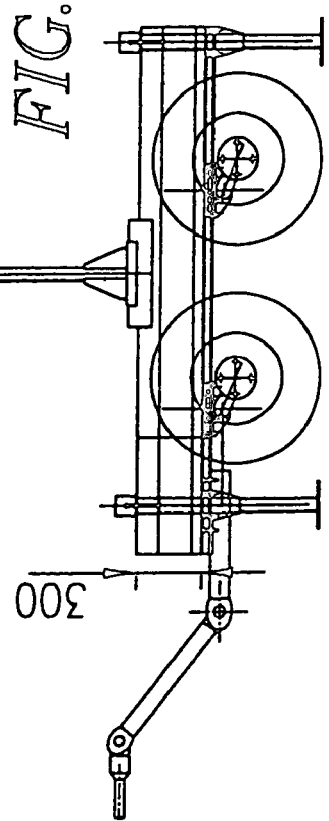
FIG. 19  FIG. 20  FIG. 21

PUMP SYSTEM WITH VACUUM SOURCE

This application is a continuation of U.S. patent application Ser. No. 10/099,810, filed Mar. 15, 2002, now U.S. Pat. No. 6,692,234, entitled "Pump System With Vacuum Source" which is a continuation-in-part of U.S. patent application Ser. No. 09/907,193, filed Jul. 17, 2001, now U.S. Pat. No. 6,585,492, entitled "Pump System with Vacuum Source" which is a Divisional patent application Ser. No. 09/531,631 filed on Mar. 21, 2000, now U.S. Pat. No. 6,315,524, entiled "Pump System with Vacuum Source" which claims priority under 35 U.S.C. §119(e)(1) to U.S. Provisional Patent Application Ser. No. 60/125,559, filed Mar. 22, 1999, and entitled "Pump Assembly and Related Components".

FIELD OF THE INVENTION

The present invention relates generally to pumps. More particularly, the present invention relates to self-priming pump systems.

BACKGROUND OF THE INVENTION

Self-priming pump systems typically include a motor, a main pump having a feeding reservoir, and a vacuum source. The vacuum source is typically fluidly connected to the reservoir, and draws pumped fluid into the reservoir to prime the pump. The reliability of such pumps is often affected by the particular application of use, as well as the environmental conditions. For many applications, the fluid being pumped includes suspended solids such as sand, silt, rocks, rags etc., and may be under a negative, neutral or positive head pressure. In addition, the temperature, humidity and air quality around the pump can vary greatly. Because of these varying applications and conditions, the reliability and maintenance of such self-priming pumps can be less than desirable.

SUMMARY OF THE INVENTION

The present invention provides a self-priming pumping system for pumping water, sewage or other pumped material from one location to another. The pumping system preferably includes a motor coupled to a centrifugal pump for driving the centrifugal pump. The pumping system also preferably includes a feeding separator that defines a reservoir that is in fluid communication with the main inlet of the centrifugal pump.

In one illustrative embodiment, a liquid ring vacuum pump is used to prime the pump. The liquid ring vacuum pump preferably includes an inlet that is in fluid communication with the reservoir of the separator. The vacuum pump provides a vacuum to the reservoir, which draws pumped fluid into the reservoir. A float is provided to monitor or detect the fluid level in the reservoir. When the pumped fluid level reaches a desired level, the float may open a valve to let air into the reservoir to maintain the desired level.

The discharge from the vacuum pump is preferably provided to a tank. The tank may be located outside of the reservoir, or preferably within the reservoir. Liquid is collected from the discharge of the vacuum pump by the inner tank, and is provided back to the liquid ring vacuum pump, thereby forming a closed system.

Under neutral or negative head pressure, the vacuum pump causes air to flow from the reservoir into the vacuum pump. It has been found that this airflow, along with vibration or movement of the pump, may cause the pumped fluid inside the reservoir to splash, mist, or otherwise enter the inlet of the vacuum pump. This fluid, which may include sediments or the like, may cause damage to the vacuum pump. In cold weather applications, the fluid may also dilute any antifreeze used in the vacuum pump system, which can reduce the reliability of the system.

To help reduce the possibility that the pumped fluid will enter the vacuum pump system, a deflector may be provided in the reservoir, preferably between the inlet to the vacuum pump and the pumped fluid in the reservoir. This deflector is preferably adapted to deflect or otherwise reduce the possibility that the fluid in the reservoir will enter the inlet of the vacuum pump. Alternatively, or in addition, an extension may be provided on top of the separator. This extension may have a lateral cross-section that is less than the lateral cross-section of the reservoir, but greater than the lateral cross-section of the upper outlet in the reservoir. This extension may increase the distance between the pumped fluid in the reservoir and an upper outlet in the reservoir. Because the distance is increased, the amount of fluid that may splash or otherwise enter the upper outlet, and thus the inlet of the vacuum pump, may be reduced. In addition, because the lateral cross-section is greater than the lateral cross-section of the upper outlet, the extension may help reduce the velocity of the air at the top of the reservoir, which may help reduce the possibility that the fluid will be drawn into the inlet of the vacuum pump. Another approach is to increase the height of the separator itself.

As noted above, the inner tank may receive liquid from the discharge of the vacuum pump, and provides liquid to the liquid ring vacuum pump. To increase the reliability of the liquid ring vacuum pump, the inner tank may be designed to collect sediments in the liquid of the vacuum pump system. For example, the bottom and/or side surfaces of the inner tank may be configured to help collect sediment near a drain port. Alternatively, or in addition, one or more baffles may be provided to help direct or collect the sediment. Once the sediment is collected, a drain port can be opened, and the collected sediment may be removed. In-line filters may also be provided, to help further collect sediment.

Under some conditions, the fluid level in the inner tank may decrease over time. To help maintain a proper fluid level in the inner tank, it is contemplated that the inner tank may be selectively fluidly connected to a fluid source, such as the main pump output. When connected, the fluid source may provide fluid, preferably under pressure, to the inner tank to replenish the fluid in the inner tank. A filter may be provided between the fluid source and the inner tank to help prevent sediment from entering the inner tank.

Under positive head pressure, the fluid level in the reservoir will tend to rise, and in some circumstances, fill the reservoir. To help prevent the pumped fluid in the reservoir from escaping from the reservoir, it is contemplated that the valve that is controlled by the float in the reservoir may be a one-way valve, letting air into the reservoir when the fluid level rises above a desired fluid level, but not letting fluid out of the reservoir. In addition, a valve may be disposed between the upper outlet in the reservoir and the inlet of the vacuum pump. This valve may close when the fluid level in the reservoir reaches some predefined maximum level. Preferably, when the fluid level in the reservoir reaches the predefined maximum level, the valve between the upper outlet in the reservoir and the inlet of the vacuum pump fluidly connects the inlet of the vacuum pump to atmosphere. This may help reduce the load on the vacuum pump.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the Figures thereof and wherein:

FIG. 12 is a top view of the base plate of a liquid ring vacuum pump assembly in accordance with an exemplary embodiment of the present invention;

FIG. 13 is a top view of a port plate of a liquid ring vacuum pump assembly in accordance with an exemplary embodiment of the present invention;

FIG. 19 is a partial cross-sectional side view of a preferred single axle trailer assembly for transporting a pump assembly;

FIG. 20 is a partial cross-sectional bottom view of the single axle trailer assembly of FIG. 19;

FIG. 21 is a partial cross-sectional side view of a preferred two axle trailer assembly for transporting a pump assembly;

DETAILED DESCRIPTION OF THE PREFERRED EMBODIMENTS

The following detailed description should be read with reference to the drawings, in which like elements in different drawings are numbered in like fashion. The drawings which are not necessarily to scale, depict selected embodiments and are not intended to limit the scope of the invention. In some cases, the drawings may be highly diagrammatic in nature. Examples of constructions, materials, dimensions, and manufacturing processes are provided for various elements. Those skilled in the art will recognize that many of the examples provided have suitable alternatives which may be utilized.

Figure 1:
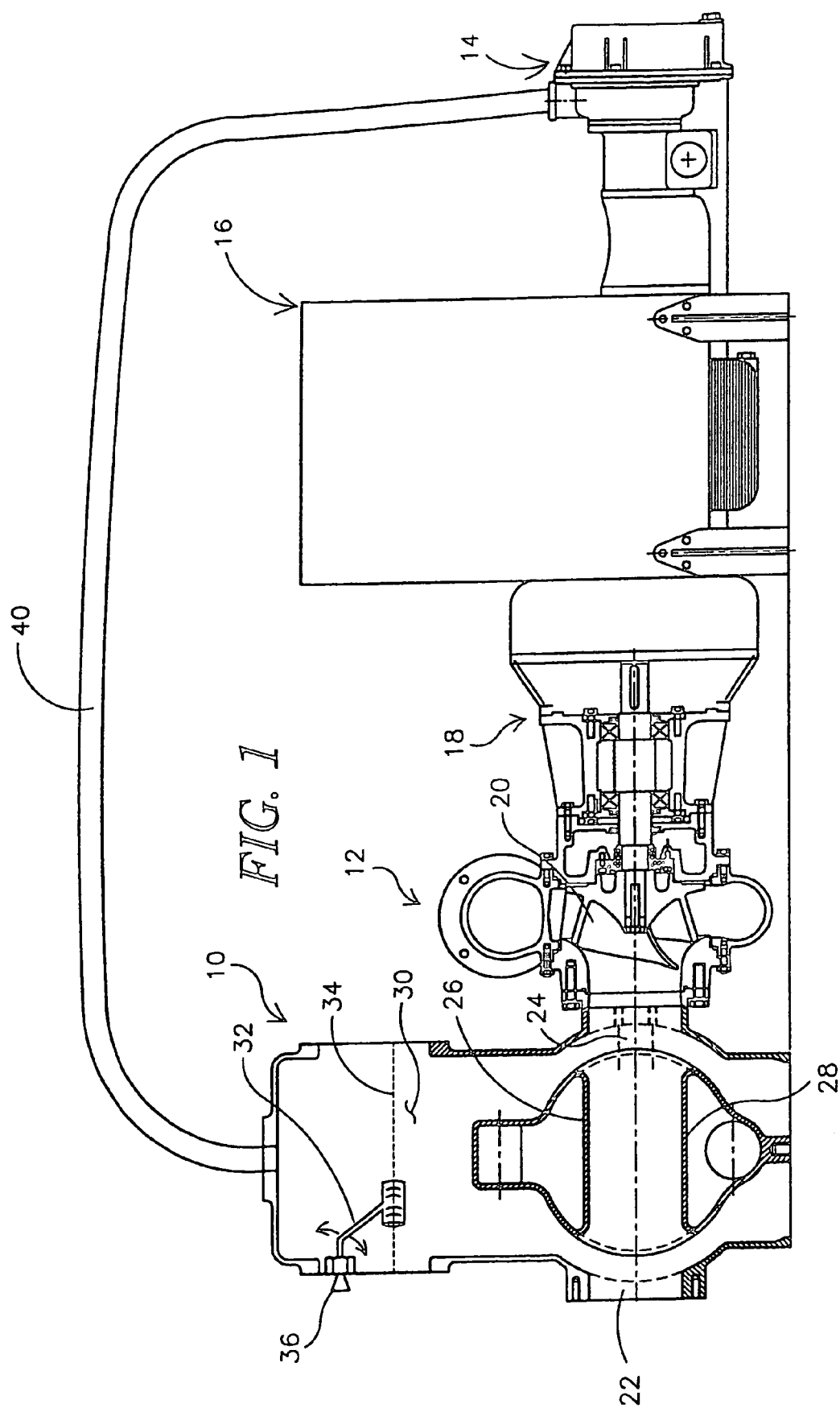
FIG. 1 is a partial cross-sectional side view of a pump assembly in accordance with a preferred embodiment of the present invention.

The present invention provides an improved pump assembly and related components. The improved pump assembly is generally shown in FIG. 1 and includes a separator 10, a centrifugal primary pump assembly 12, a liquid ring vacuum pump 14 and a motor 16.

The separator 10 includes an intake port 22 and an output port 24. The intake port 22 is the input port for the pump. The intake port 22 and the output port 24 preferably have substantially the same dimension and shape to provide a smooth flow path for the pumped material. Flow directors 26 and 28 are part of a tube having a diameter which is similar to the diameter of an eye of the impeller. This may help further direct the flow through the separator 10 and in a straight line with the impeller.

Extending above the intake port 22 and the output port 24 is reservoir 30. Reservoir 30 stores a reservoir of pumped material for maintaining the pump's prime during short intermittent disruptions of the pumped material. The pump is first primed by creating a vacuum in the reservoir 30 using the liquid ring vacuum pump 14 and interconnecting hose 40. The vacuum provided by the vacuum pump assembly 14 initially creates and then maintains an optimum level 34 of pumped material in reservoir 30.

A float system 32 is used to maintain the optimum level 34 of pumped material in the reservoir 30. If the level of pumped material in the reservoir 30 exceeds the optimum level 34, the float system opens a valve 36 or the like to the outside to reduce the vacuum in the reservoir 30. Once the valve is open, the primary pump assembly 12 removes more of the pumped material from the reservoir 30, thereby reducing the level in the reservoir 30. If the level of the pumped material falls below the optimum level 34, the float system closes the valve 36, thereby allowing the vacuum pump assembly 14 to increase the vacuum in the reservoir 30, which in turn, increases the level in the reservoir 30.

For optimum pump performance, the float system 32 should be neither under-dampen or over-dampen. If the float system 32 is over-dampened, the float system may be slow to respond to changes in the level of reservoir 30. Hence, the reservoir 30 may become overly full or overly empty during normal operation.

If the reservoir 30 becomes overly full, some of the pumped material may be forced into the vacuum pump 14 through hose 40. This can contaminate the water used in the liquid ring vacuum pump, and can result in the discharge of some of the pumped material from the vacuum pump discharge onto the ground. If the reservoir 30 becomes overly empty, the pump may become at least momentarily unprimed. This can reduce the efficiency of the pump.

In contrast, if the float system 32 is under-dampened, the float system 32 may respond too quickly to changes in the level of reservoir 30. This can cause the valve 36 to remain open much of the time, thereby reducing the efficiency of the pump. As can readily be seen, the float system 32 must be carefully designed to achieve optimum pump performance. In the present invention, this is achieved by optimizing the weight, shape and dimensions of the float system 32.

Once properly primed, the primary pump assembly 12 draws the pumped material through the separator 10, and directs the pumped material out of a discharge port. A further discussion of the primary pump assembly 12 is provided below.

The primary pump assembly 12 is preferably directly coupled to the flywheel of the motor 16 through an oil lubricated bearing housing 18. The oil lubricated bearing housing 18 transfers the power directly from the motor 16 to the impeller 20 of the primary pump assembly 12. By directly coupling the motor 16 to the primary pump assembly 12, no belts are required. In addition, the alignment between the motor 16 and the primary pump assembly 12 is fixed by the bearing housing 18, which reduces bearing wear. Both of these tend to increase the overall reliability of the pump. Although not preferred, it is contemplated that the bearing housing 18 may include a mechanism for gearing up or gearing down the speed of the impeller 20 relative to the RPM's of the motor 16.

For similar reasons discussed above, the liquid ring vacuum pump 14 is also preferably directly driven by motor 16. In FIG. 1, the liquid ring vacuum pump 14 is driven off the opposite side of the drive shaft of motor 16. If motor 16 does not provide access to both sides of the drive shaft, vacuum pump 14 may be directly driven using an optional bevel gear provided off bearing housing 18, as shown for example, in FIG. 18 below. It is contemplated that the motor 16 may be any type of motor including a combustion motor or an electric motor. Preferably, however, the motor 16 is a diesel motor such as a Deutz™, Detroit VM™ Sun Diesel, Caterpillar® or John Deere® motor.

Figure 2:
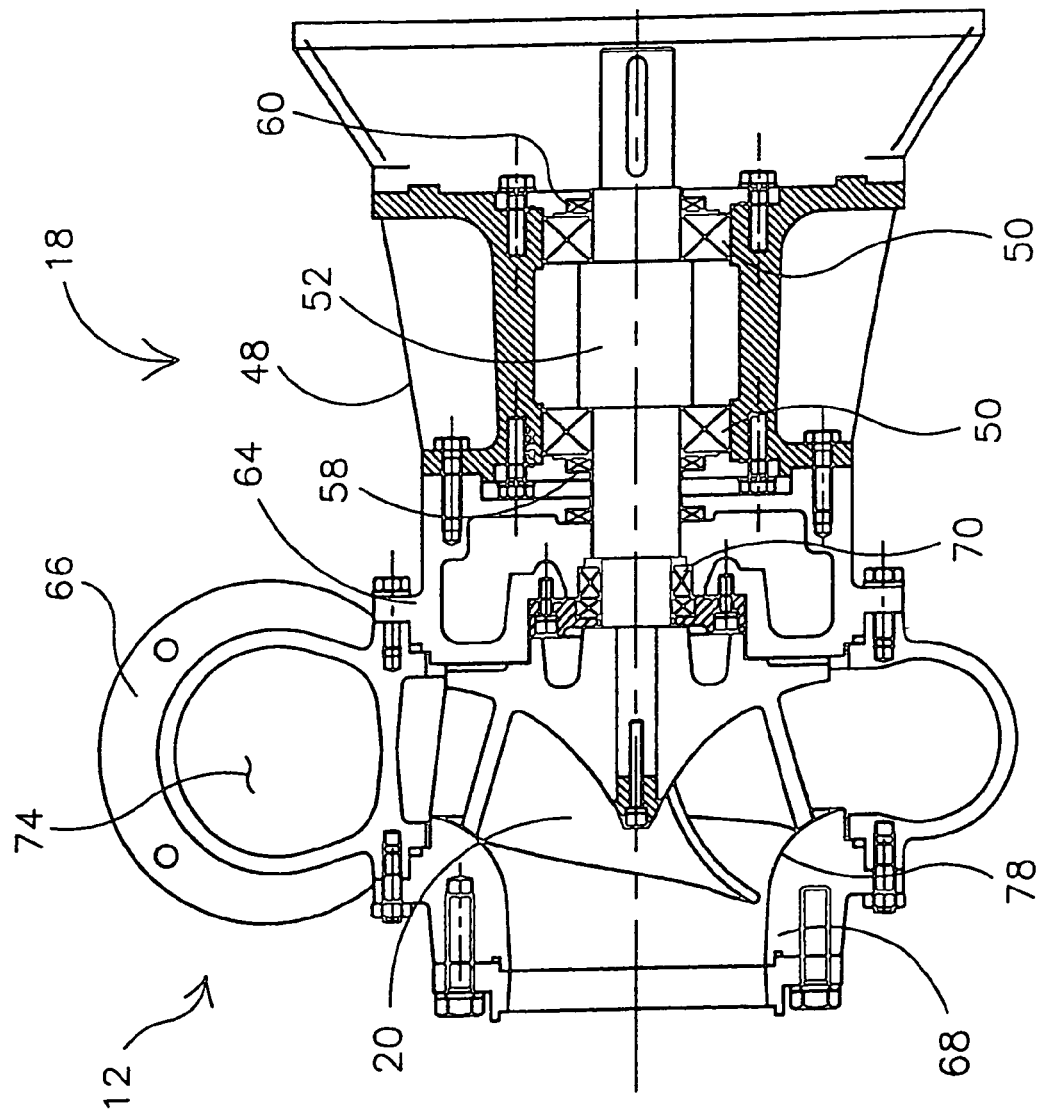
FIG. 2 is an enlarged partial cross-sectional side view of the primary pump assembly and bearing housing of FIG. 1.

FIG. 2 is an enlarged partial cross-sectional side view of the primary pump assembly 12 and bearing housing 18 of FIG. 1. As indicated above, the bearing housing 18 directly transfers the power from the motor 16 to the impeller 20 of the primary pump assembly 12. The bearing housing 18 includes bearings 50 and drive shaft 52. Oil used to lubricate bearings 50 is preferably sealed between the front oil seal 58 and the rear oil seal 60.

The primary pump assembly 12 preferably includes a back plate 64, a volute 66 and an adjustable front plate 68. The back plate 64 and front plate 68 are sometimes referred to as wear plates. The drive shaft 52 extends through the back plate 64 and drives the impeller 20. The back plate 64 preferably includes a rear seal 70 around the drive shaft 52 to prevent pumped material from escaping therethrough. The impeller 20 drives the pumped material from the separator 10 into the volute discharge cavity 74. At the end of the volute discharge cavity 74 is the discharge port of the pump.

Figure 3:
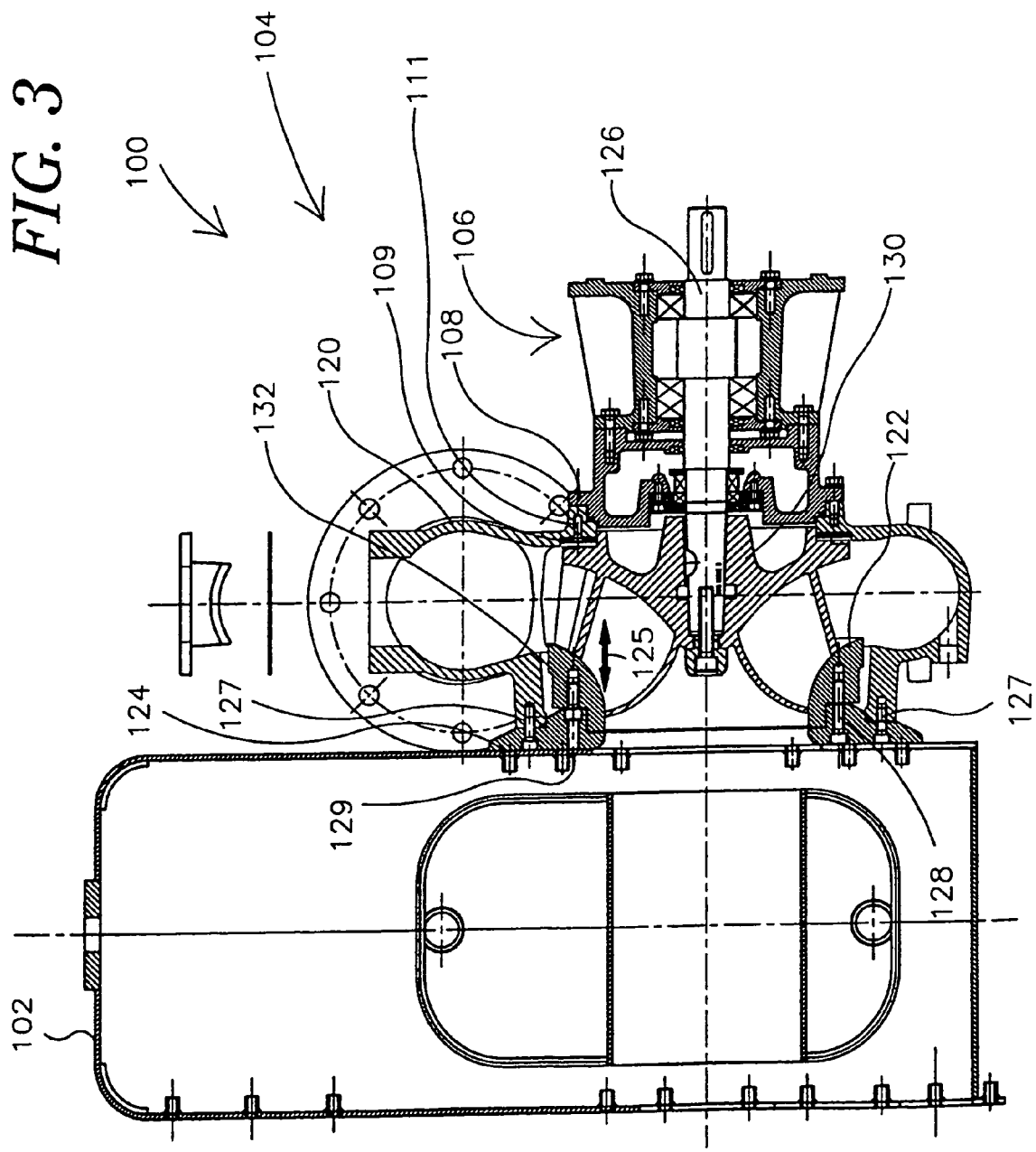
FIG. 3 is a partial cross-sectional side view of an additional embodiment of a pump assembly in accordance with the present invention.

FIG. 3 is a partial cross-sectional side view of an additional embodiment of a pump assembly 100 in accordance with the present invention. Pump assembly 100 includes a primary pump assembly 104, a bearing housing 106, and a separator 102. Primary pump assembly 104 includes a back plate 108, a back wear plate 109, a volute 120, a front plate 122, and a mounting flange 124.

A drive shaft 126 extends through back plate 108 and drives an impeller 130. Mounting flange 124 is preferably fixed to separator 102 by a plurality of fasteners (not shown) and to volute 120 via a plurality of fasteners 127. Front plate 122 is fixed to mounting flange 124 by a plurality of pull screws 128.

As illustrated by arrow 125, front plate 122 can preferably be adjusted toward or away from impeller 130. In a preferred embodiment, the position of front plate 122 may be adjusted utilizing a plurality of pull screws 128, and a plurality of push screws 132. For purposes of illustration, one pull screw 128 and one push screw 132 are shown in FIG. 3. A top 129 of push screw 132 is seated against mounting flange 124. Rotating push screw 132 in a counter clockwise direction will cause push screw 132 to urge front plate 122 away from mounting flange 124. Front plate 122 may be fixed in the desired position by tightening pull screws 128.

Back wear plate 109 is fixed to an inner surface of volute 120 by a plurality of fasteners 111. This may allow the impeller to extend laterally beyond the back plate 108. The position of back wear plate 109 may be adjusted to compensate for wear. Various methods of adjusting the position of back wear plate 109 may be utilized without deviating from the spirit and scope of the present invention. For example, a plurality of shims may be placed between back wear plate 109 and volute 120. Embodiments of the present invention have also been envisioned in which the position of back wear plate 109 may be adjusted utilizing a plurality of push screws and a plurality of pull screws. In this envisioned embodiment, the position of back wear plate 109 may be adjusted using a method similar to the method described above for adjusting the position of front plate 122.

Figure 4:
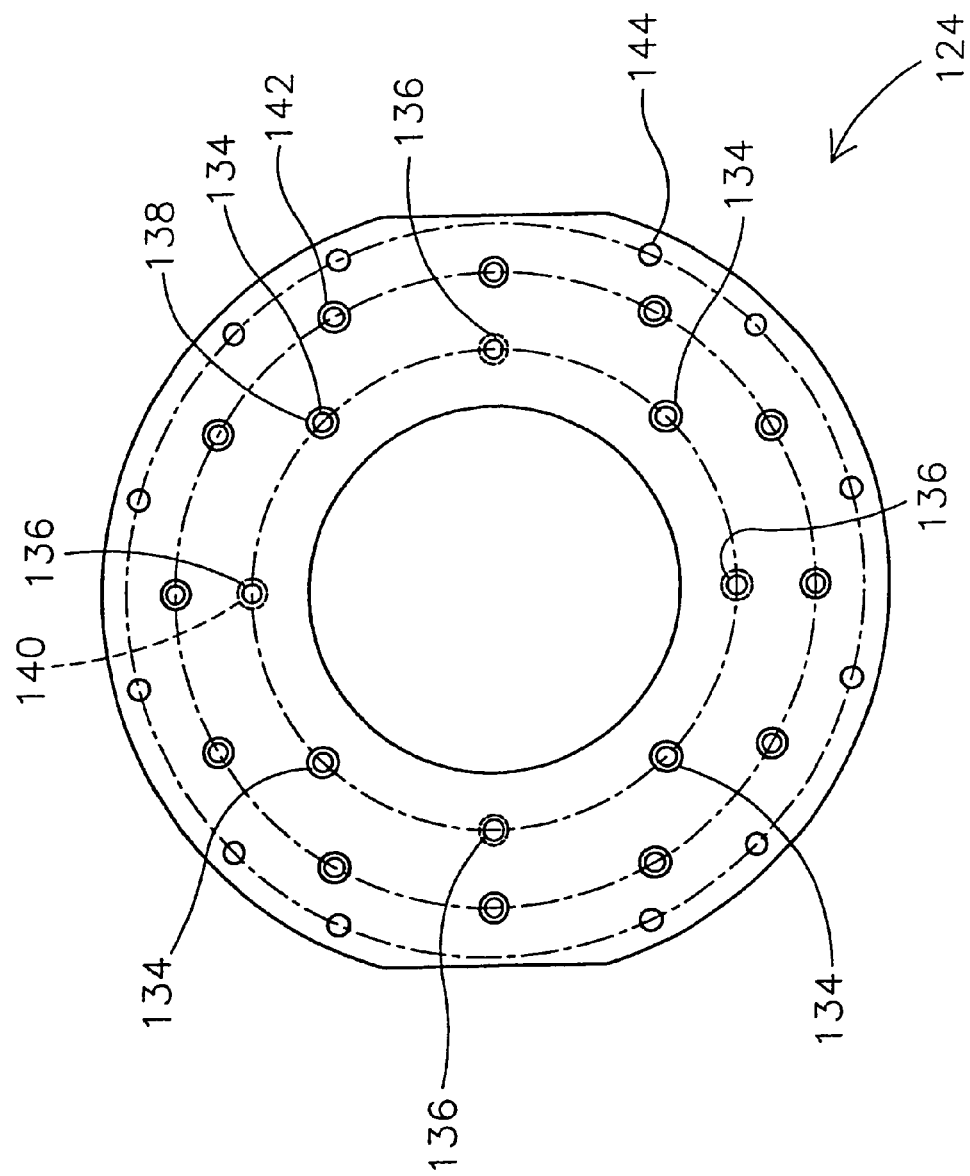
FIG. 4 is a plan view of a mounting flange in accordance with an exemplary embodiment of the present invention.

FIG. 4 is a plan view of mounting flange 124. Mounting flange 124 defines a plurality of front plate mounting holes 134 and a plurality of adjustment holes 136. Each front plate mounting hole 134 includes a counter bore 138 which is adapted to accept the head of a pull screw 128. Likewise, each adjustment hole 136 includes a bore 140 which is adapted to accept the head of an push screw 132. Counter bore 138 of each front plate mounting hole 134 is defined by a front face of mounting flange 124, and the counter bore 140 of each adjustment hole 136 is defined by a back face of mounting flange 124.

Figure 5:
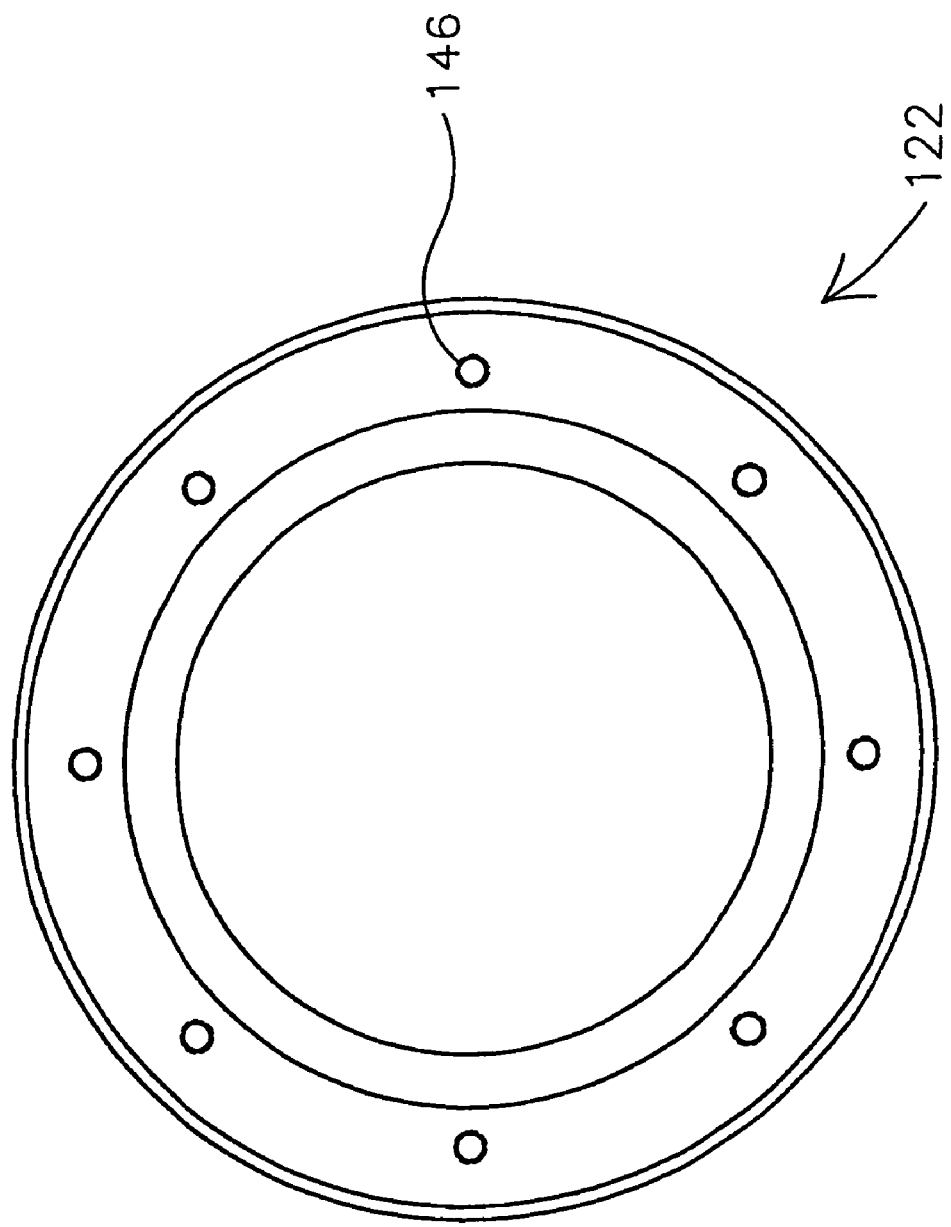
FIG. 5 is a plan view of a front plate in accordance with an exemplary embodiment of the present invention.

Mounting flange 124 also preferably defines a plurality of volute mounting holes 142. In a preferred embodiment of pump assembly 100, volute mounting holes 142 are adapted to accept fasteners which fix mounting flange 124 to volute 120. Mounting flange 124 also defines a plurality of separator mounting holes 144. Like the volute mounting holes 142, separator mounting holes 144 are adapted to accept fasteners which fix mounting flange 124 to separator 102. FIG. 5 is a plan view of front plate 122 of FIG. 3, with a plurality of threaded holes 146 that are adapted to accept pull screws 128 and push screws 132.

Figure 6:
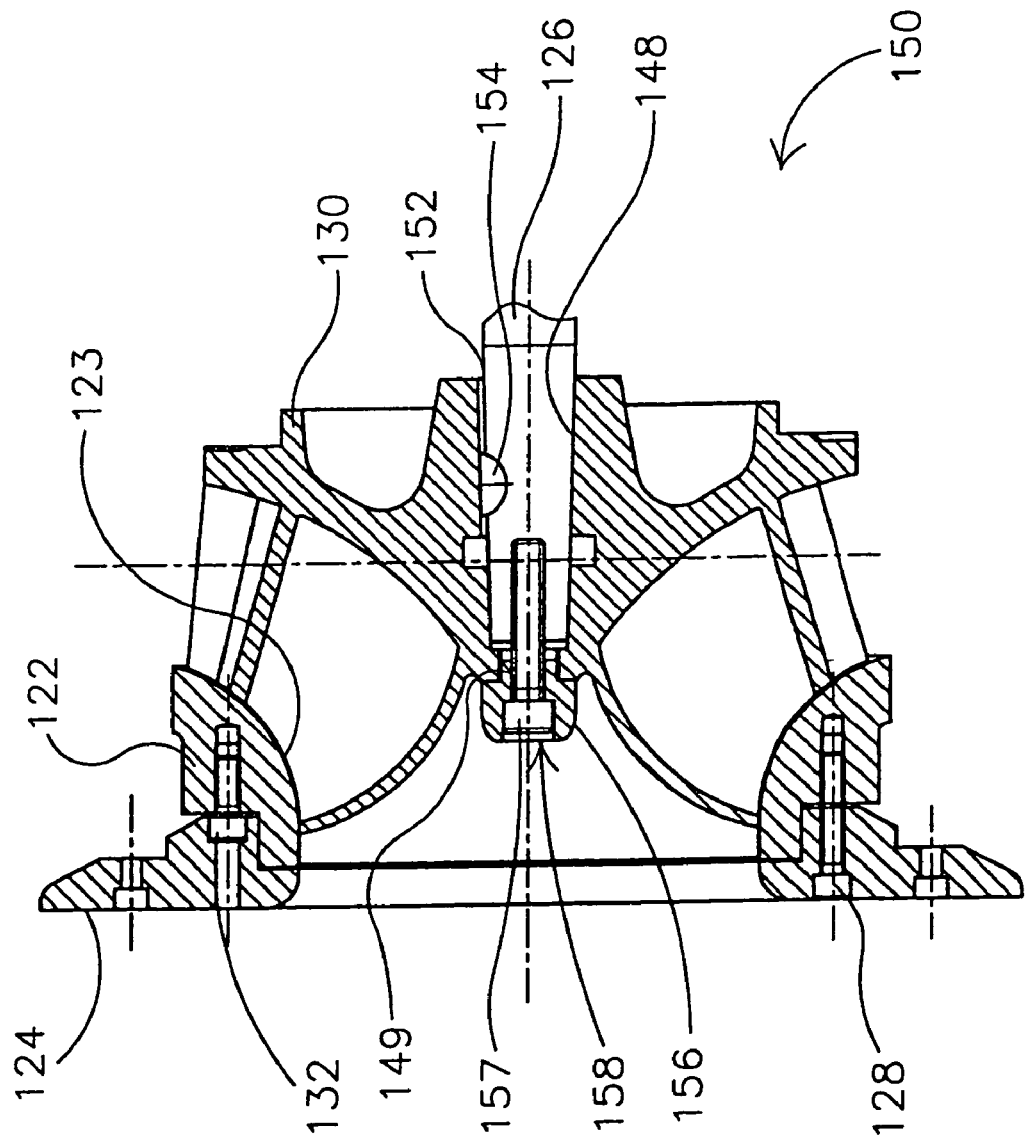
FIG. 6 is a cross-sectional side view of an assembly in accordance with an exemplary embodiment of the present invention.

FIG. 6 is a cross-sectional side view of an assembly 150 in accordance with the present invention. Assembly 150 includes mounting flange 124 which is fixed to front plate 122 with a plurality of pull screws 128. In FIG. 6, front plate 122 is in an outward position. Front plate 122 may be selectively moved to an inward position by loosening pull screws 128 and rotating a plurality of push screws 132, as shown in FIG. 7.

Figure 7:
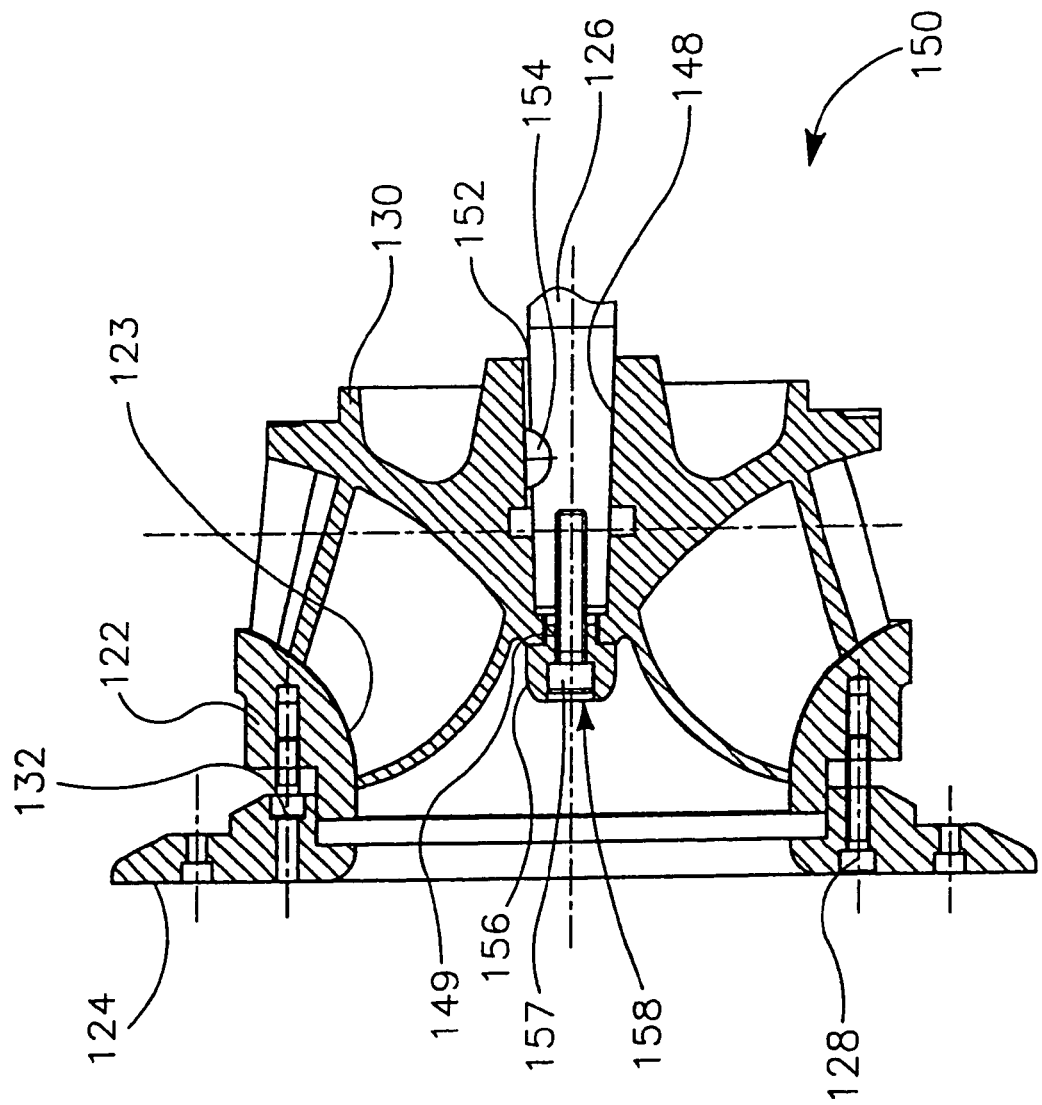
FIG. 7 is a cross-sectional side view of an assembly in accordance with an exemplary embodiment of the present invention.

Assembly 150 of FIG. 6 and FIG. 7 also show an impeller 130 defining a bore 148 and a keyway 152. A drive shaft 126 is disposed in bore 148, and a key 154 is disposed in keyway 152. An impeller fastener 157 is utilized to fix impeller 130 to drive shaft 126. A rounded cap 156 is disposed about a head portion 158 of impeller fastener 157. Rounded cap 156 makes the pump less prone to clogging, because fibrous and stringy materials such as rags are less likely to become wrapped around rounded cap 156 and clog the pump. Impeller 130 also defines a thread 149.

In a preferred embodiment, thread 149 is adapted to threadingly engage a jack bolt (not shown). In a method in accordance with the present invention, a jack bolt may be utilized to remove impeller 130 from the drive shaft 126. The jack bolt may be turned into thread 149 until it is seated against a distal end of drive shaft 126. The jack bolt may be turned further to urge impeller 130 distally away from the drive shaft 126.

To reduce turbulence, cavitation and clogging in the pump, impeller 130 preferably includes two interlocking spiral blades. The spiral impeller design efficiently drives the pumped material from the separator 102 into the volute discharge cavity, and also helps reduce clogging of the pump caused by rags or other fibrous or stringy materials. The fibrous and stringy materials are more efficiently passed through the impeller and into the volute discharge cavity.

The front plate 122 preferably has a rounded inner surface 123. Rounded inner surface 123 provides a smooth transition between the separator 102 and the volute discharge cavity. Preferably, the volute, impeller 130 and front plate 122 are all designed to provide a smooth flow path from the separator, through the impeller and into the volute discharge cavity. This smooth flow path may increase the efficiency of the pump while reducing damage to the impeller, wear plates, bearings and shaft. A further discussion for a preferred flow path configuration is described below with reference to FIG. 11.

The outward ends of the two interlocking spiral blades of the impeller 130 preferably are in close tolerance (preferably 30 mils or less) to the rounded inner surface 123 of front plate 122. Such a tolerance is difficult to maintain over extended periods because during use the two interlocking spiral blades tend to become worn. This wear increases the gap between the spiral blades and rounded inner surface 123 of the front plate 122. To correct for this, the position of front plate 122 may be adjusted as describe above.

Figure 8:
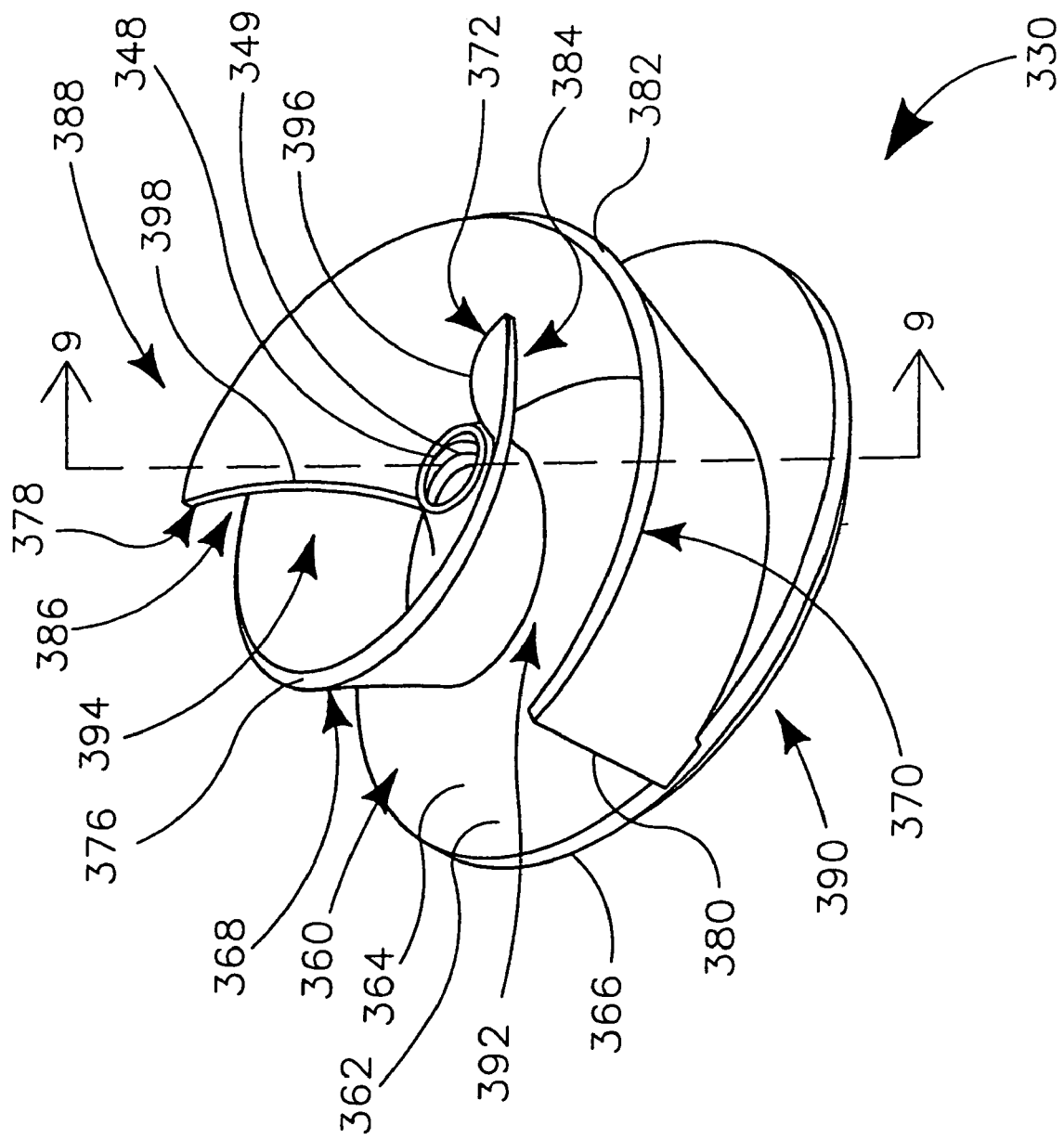
FIG. 8 is a perspective view of an impeller in accordance with an exemplary embodiment of the present invention.

FIG. 8 is a perspective view of an impeller 330 in accordance with the present invention. Impeller 330 includes a core member 360 having a front face 362, a back face 366, and a central bore 348 extending therebetween. Central bore 348 is preferably adapted to receive a drive shaft. Impeller 330 preferably defines a thread 349 proximate a distal end of central bore 348. As described above, the thread 349 can be used in conjunction with a jack screw to remove the impeller 330 from the drive shaft.

Front face 362 of core member 360 preferably defines a curved surface 364, such as a toroidal surface. A first blade 368 and a second blade 370 are fixed to front face 362 of core member 360. In the embodiment shown in FIG. 8, the first blade 368 and the second blade 370 each have a generally spiral shape. First blade 368 includes a leading edge 372, a trailing edge 374 (not visible in FIG. 8), and a top edge 376. Likewise, second blade 370 includes a leading edge 378, a trailing edge 380, and a top edge 382.

The first blade 368 also includes a leading portion 384 proximate leading edge 372, and a trailing portion 386 proximate trailing edge 374. Likewise, second blade 370 includes a leading portion 388 proximate leading edge 378, and a trailing portion 390 proximate trailing edge 380. Preferably, leading portion 384 of first blade 368 radially overlaps trailing portion 390 of second blade 370. Likewise, leading portion 388 of second blade 370 preferably radially overlaps trailing portion of first blade 368.

As such, impeller 330 may include a first channel 392 defined by the leading portion 384 of the first blade 368, the trailing portion 390 of the second blade 370, and the front face 362 of the core member 360. Impeller 330 may also include a second channel 394 defined by the leading portion 388 of the second blade 370, the trailing portion 386 of the first blade 368, and the front face 362 of the core member 360.

In the embodiment shown, the first leading edge 372 of the first blade 368 defines a radius 396, and leading edge 378 of second blade 370 defines a radius 398. Radius 396 is preferably equal to radius 398. The amount of curvature of each blade preferably gradually decreases toward the trailing edge of the blade.

Figure 9:
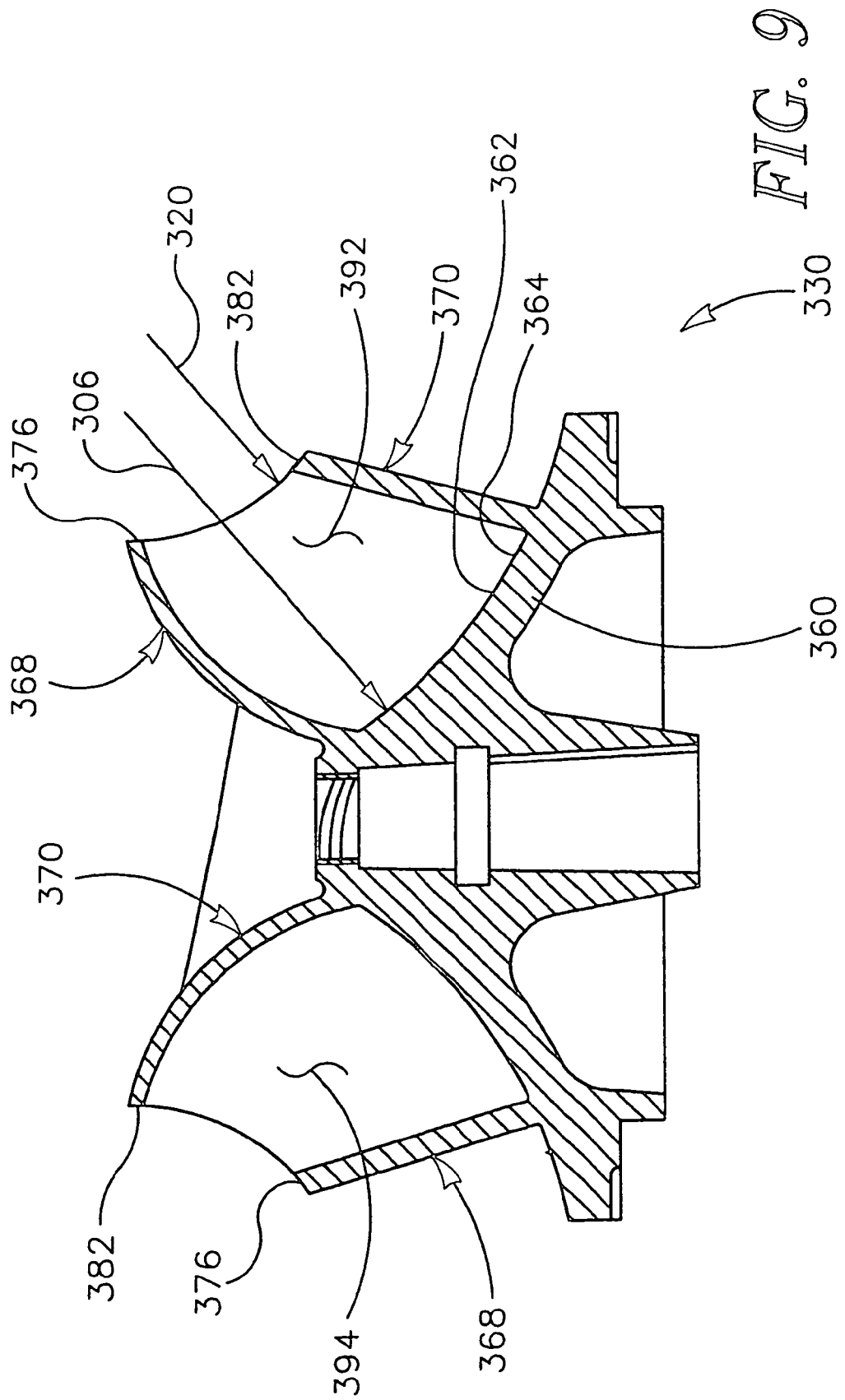
FIG. 9 is a cross-sectional side view of the impeller of FIG. 8.

FIG. 9 is a cross-sectional side view of impeller 330 of FIG. 8, taken along line 99. As described above, impeller 330 includes a core member 360 having a front face 362 defining a curved surface 364 such as a toroidal surface. Curve surface 364 may have a uniform curve defining a radius 306. The top edge 376 of the first blade 368 and the top edge 382 of the second blade 370 preferably define a toroidal surface with a radius 320 as they spiral around core member 360. In a preferred embodiment, radius 320 is smaller than the radius 306 of the curved front face 362. The first channel 392 and the second channel 394 defined by the first blade 368 and the second blade 370 are also visible in FIG. 9.

Figure 10:
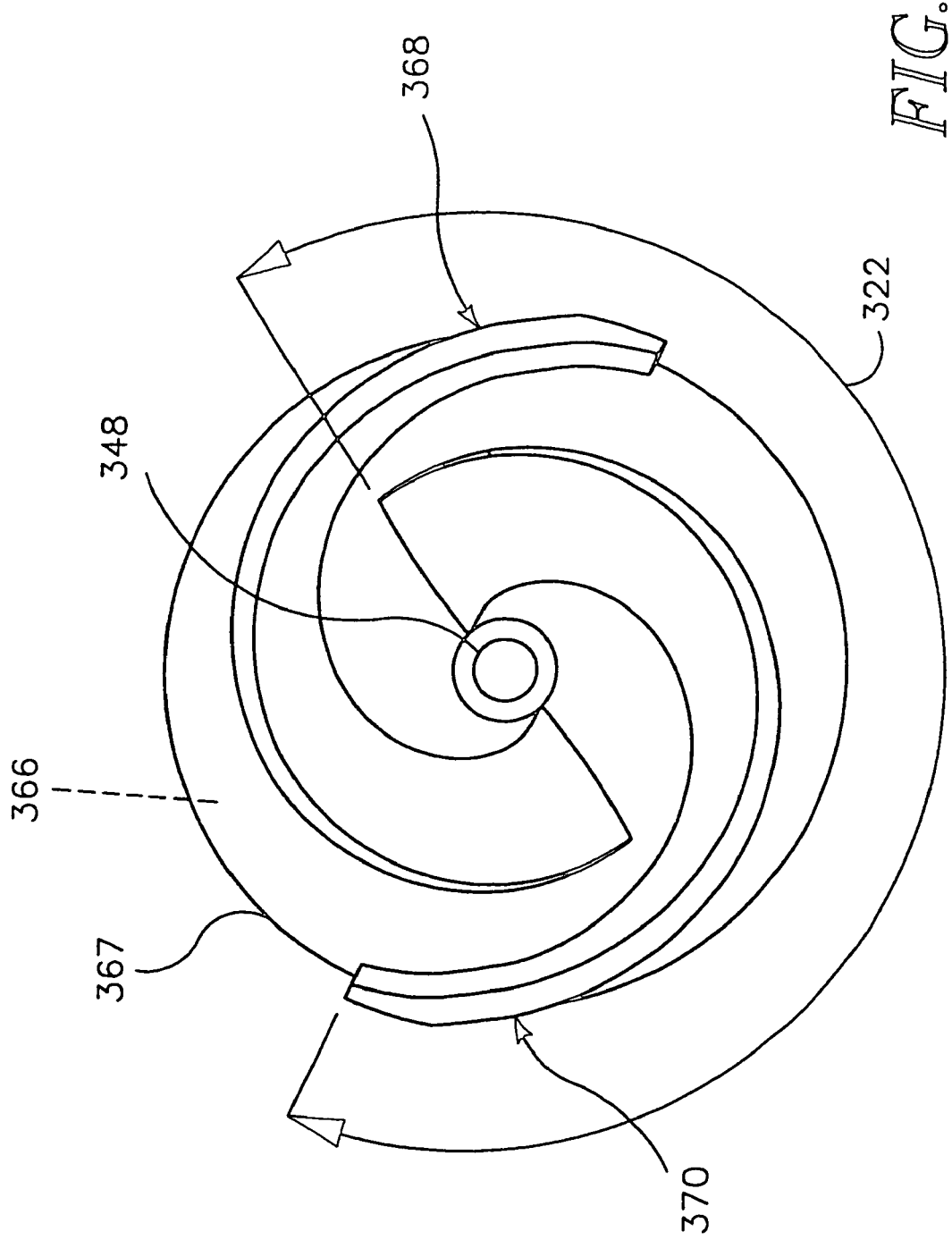
FIG. 10 is a plan view of the impeller of FIG. 8.

FIG. 10 is a plan view of the impeller 330 of FIG. 8 and FIG. 9. In FIG. 10 it may be appreciated that first blade 368 and second blade 370 each extend from near the central bore 348 to near the outer edge 367 of the back face 366 in a spiral or semi-circular shape. An angular extent 322 of the second blade 370 is illustrated in FIG. 10. In a preferred embodiment, the first blade 368 and the second blade 370 each extend more than 180 degrees around the central bore 348, and preferably in the range of 180 degrees to 360 degrees. In a particularly preferred embodiment, the first blade 368 and the second blade 370 each extend about 225 degrees around the central bore 348. Also in a preferred embodiment, the first blade 368 and the second blade 370 are each tilted away from the axis of the central bore 348, with the amount of tilt decreasing toward the trailing ends of the blades. This shape and configuration is believed to maximize pump efficiency and reduce the likelihood of cavitation.

Cavitation typically occurs when there is a localized area of low pressure within the fluid in the pump. When the pressure at a particular point is reduced to the vapor pressure of the liquid being pumped a bubble forms. During cavitation many bubbles may form, and subsequently collapse. When a bubble collapses, a localized area of very high pressure is formed. The very high intermittent pressures created during cavitation may damage portions of the pump which are near the cavitation. Thus, for example, cavitation has been known to cause pitting of an impeller. Cavitation may also reduce the efficiency of a pump, as energy is wasted in producing the cavitation and disrupting the smooth flow of the fluid through the pump.

Figure 11:
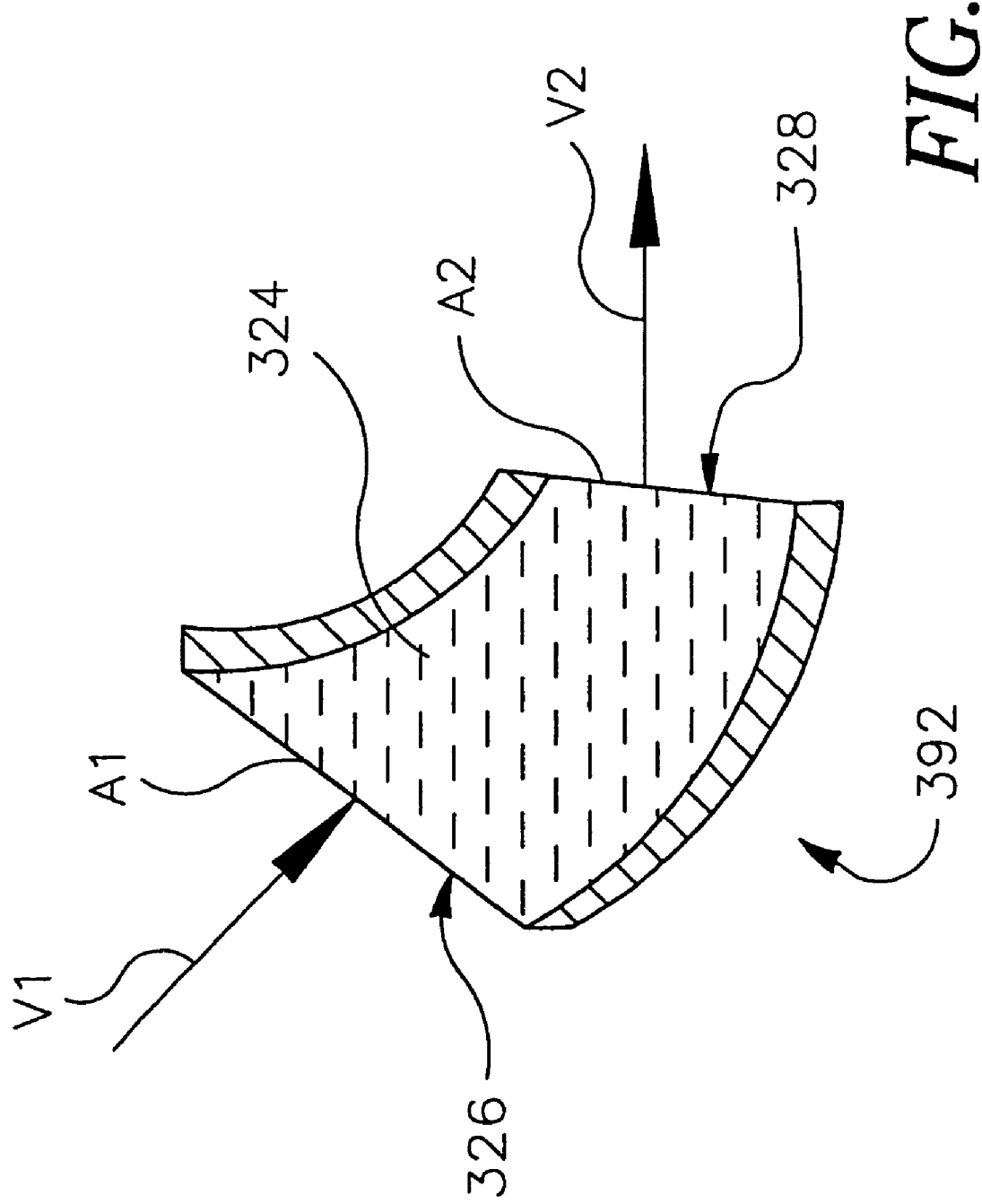
FIG. 11 is a diagrammatic representation of a flow channel in accordance with the present invention.

FIG. 11 is a diagrammatic representation of a flow channel 392 in accordance with a preferred embodiment of the present invention. A fluid 324 is disposed in flow channel 392. Flow channel 392 includes a channel inlet 326 and a channel outlet 328. Channel inlet 326 has a lateral cross-sectional area of A1. Channel outlet 328 has a lateral cross-sectional area of A2, where A2 is smaller than A1. The velocity of the fluid entering channel inlet 326 is represented by arrow V1, and the velocity of the fluid exiting channel outlet 328 is represented by arrow V2, where V2 is larger than V1. In a preferred embodiment, the lateral cross-sectional area of flow channel 392 decreases as the velocity of fluid 324 increases. Such that, the volume rate of flow of fluid 324 is substantially constant through flow channel 392. Likewise, the pressure of the fluid 324 is preferably substantially constant through flow channel 392. This is believed to produce the most efficient flow path for the pumped material. To accomplish this, both the impeller and the front wear plate are preferably designed to produce a flow channel that satisfies these requirements.

FIG. 12 through FIG. 16 show various components of the liquid ring vacuum pump assembly 14 of FIG. 1. The liquid ring vacuum pump 14 includes a base plate 710, a port plate 730, an impeller 738 and a cover 750. FIG. 12 is a top view of a base plate 710. Base plate 710 includes an intake bore 714 that is in fluid communication with an intake chamber 712A, and a discharge bore 712 that is in fluid communication with a discharge chamber 714A. Walls 716, 718 and 720 separate the intake chamber 712A from the discharge chamber 714A. A water intake chamber 722 is defined between walls 718 and 720, as shown. The water intake chamber 722 is preferably in fluid communication with a water intake bore (not shown).

FIG. 13 is a top view of a port plate 730, which is bolted to the base plate 710 of FIG. 12. The port plate 730 separates and covers the intake chamber 712A, the discharge chamber 714A and the water intake chamber 722. The port plate 730 includes, an intake port 734, a discharge port 732 and a water intake port 736. The intake port 734 provides access to the intake chamber 712A, the discharge port 732 provides access to the discharge chamber 714A, and the water intake port 736 provides access to the water intake chamber 722. The size and shape of each of these ports is defined to provide optimum performance.

Gas entering the intake port 734 is conveyed into the impeller casting and trapped between two impeller vanes. As the impeller rotates—eccentrically to the liquid ring and casing—the volume between the vanes increases creating a vacuum. As the cycle progresses toward the discharge port 732, the volume decreases as the liquid creates compression. A small amount of liquid typically discharges with the gas. Therefore, a small amount of make-up liquid may be provided via water intake port 736. This make-up liquid helps maintain the liquid ring, and also absorbs the heat energy of the compression.

In the design shown, the discharge port 732 is smaller than the intake port 734. Both the intake port 734 and the discharge port 732 are crescent shaped with one blunt end. The blunt end 735 of the intake port 734 is arranged so that a rotating vane of an impeller passes over the blunt end 735 after passing over the rest of the intake port 734. This tends to increase the vacuum that draws gas into the space between the vanes of the impeller. In contrast, the blunt end 733 of the discharge port 732 is arranged so that a rotating vane of an impeller passes over the blunt end 733 before passing over the rest of the discharge port 732. The narrowing of the discharge port 732 tends to increase the pressure between the vanes, thereby forcing the gas from the space between the vanes of the impeller.

Figure 14:
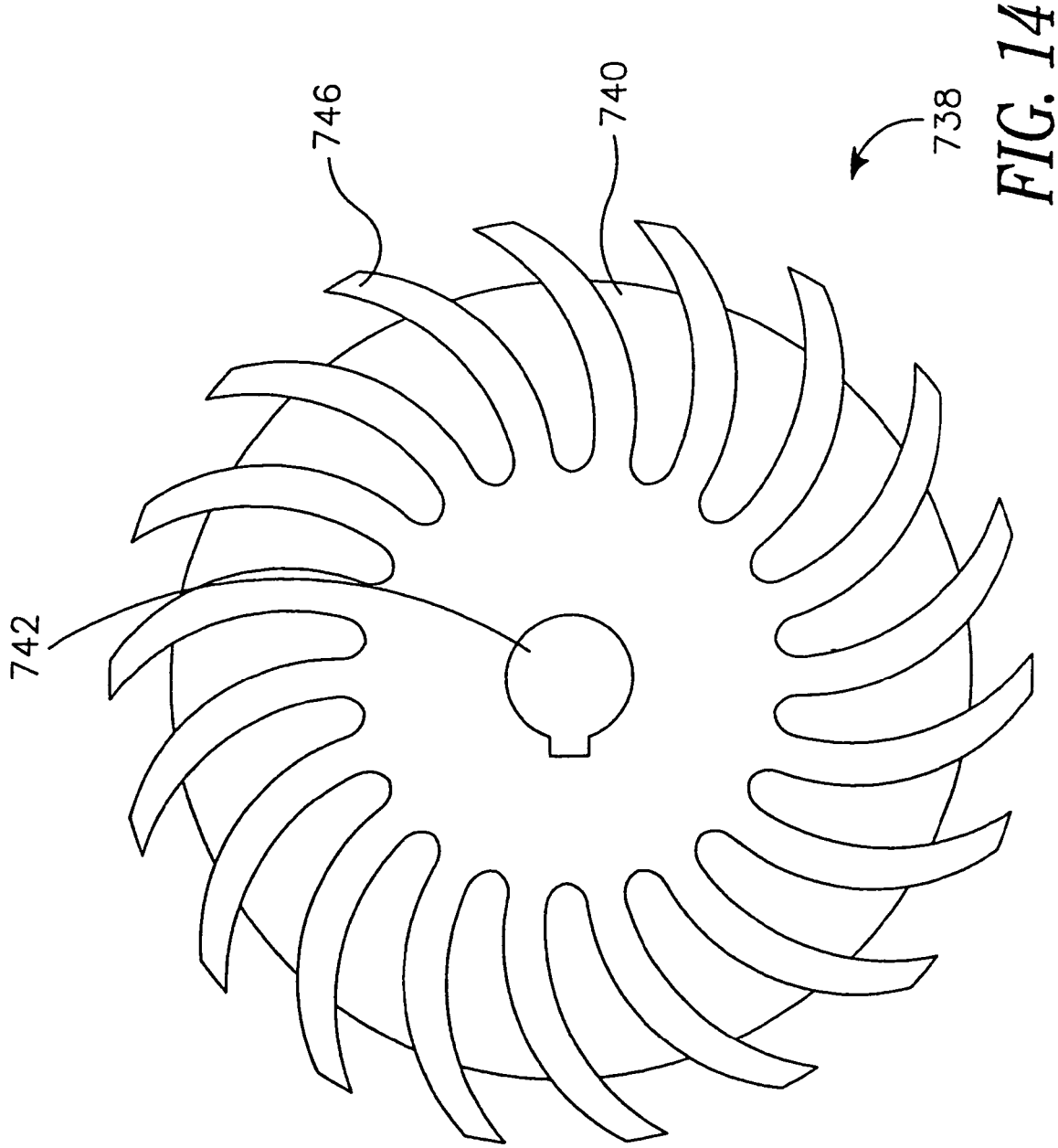
FIG. 14 is a plan view of an impeller of a liquid ring vacuum pump assembly in accordance with an exemplary embodiment of the present invention.

FIG. 14 is an enlarged side view of a preferred impeller 738 for the liquid ring vacuum pump assembly of the present invention. The impeller 738 includes aback plate 740 having a central bore 742 extending therethrough. The back plate 740 is preferably mounted away from the port plate 730 of FIG. 13, with the vanes 746 extending between the back plate 740 and the port plate 730. The central bore 742 of the back plate 740 receives a drive shaft from the motor 16 through the central bore of the port plate 730 and the base plate 710. The vanes 746 of the impeller 738 are preferably curved in shape, as shown. The curved vanes 746 extend outward away from the back plate, and substantially perpendicular to the back plate 740. It has been found that using curved vanes significantly increase the performance of the vacuum pump over a vacuum pump that uses straight vanes.

Figures 15, 16:
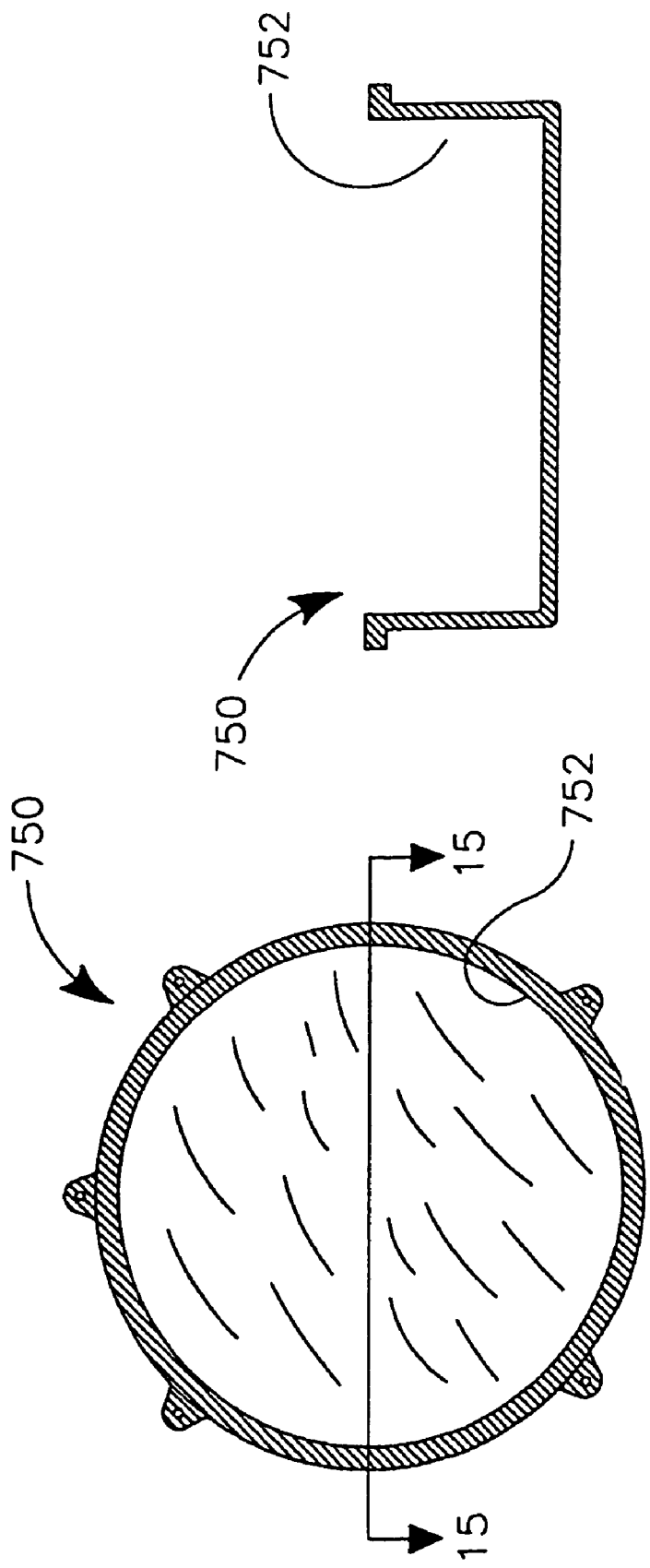
FIG. 15 is a top view of a cover of a liquid ring vacuum pump assembly of in accordance with an exemplary embodiment of the present invention.
FIG. 16 is a cross-sectional side view of the cover of FIG. 15.

FIG. 15 is a top view of a cover 750 that is provided over the impeller 738. FIG. 16 is a cross-sectional side view of the cover of FIG. 15 taken along line 15—15. The cover 750 is bolted to the base plate 710, and is sized to provide a gap between the curved vanes 746 and the inner surface 752 of the cover. At the nearest point between curved vanes 746 and inner surface 752, this gap is preferably between 0.20 millimeters and 2.00 millimeters. This gap is preferably occupied by water provided through the water intake port 736 shown in FIG. 13. The water provides both a seal and lubrication between the curved vanes 746 and the cover 750.

The liquid ring vacuum pump of the present invention provides a high flow rate. Also, and unlike many oil lubricated vacuum pump systems, the liquid ring vacuum pump of the present invention does not provide any oil discharge, which is good for the environment.

To change the capacity of the liquid ring vacuum pump of the present invention, only two parts need to be changed; the impeller 738 and the cover 750. For more capacity, the impeller is replaced with an impeller that has wider vanes 746. To accommodate the wider vanes 746, a deeper cover 750 must also be provided. Conversely, for less capacity, the impeller can be replaced with an impeller with narrower vanes 746. To accommodate the narrower vanes 746, a shallower cover 750 must be provided. Under some circumstances, such as when a large capacity change is desired, it also maybe desirably to change the port plate 730 to increase or decrease the size or shape of the intake and/or discharge ports.

The exhaust of the liquid ring vacuum pump 12 is preferably provided through discharge bore 712 (see FIG. 12). The vacuum pump discharge typically includes both air and water. To recapture the water, the vacuum pump discharge may be provided across a relative cool surface, which tends to condense the water onto the cool surface. The condensed water can then be collected and provided back to the vacuum pump. This closed system allows the liquid ring vacuum pump to operate continuously for long periods of time without having to add significant quantities of water.

It is also contemplated that the vacuum pump discharge may be provided to a muffler. For many prior art pumps, the vacuum pump discharge can produce significant noise. The vacuum pump discharge muffler may include one or more baffles which reduce the noise before the vacuum pump discharge is released to the atmosphere.

It is also contemplated that the exhaust of the vacuum pump may pass through a heat exchanger assembly. In one embodiment, the heat exchanger assembly includes a passageway which is disposed within the separator. In this embodiment, the outer walls of the passageway are in contact with the pumped material which can often be used to cool the exhaust exiting the vacuum pump discharge. Liquid which condenses in the passageway may be collected and channeled back to the liquid ring vacuum pump.

Figure 17:
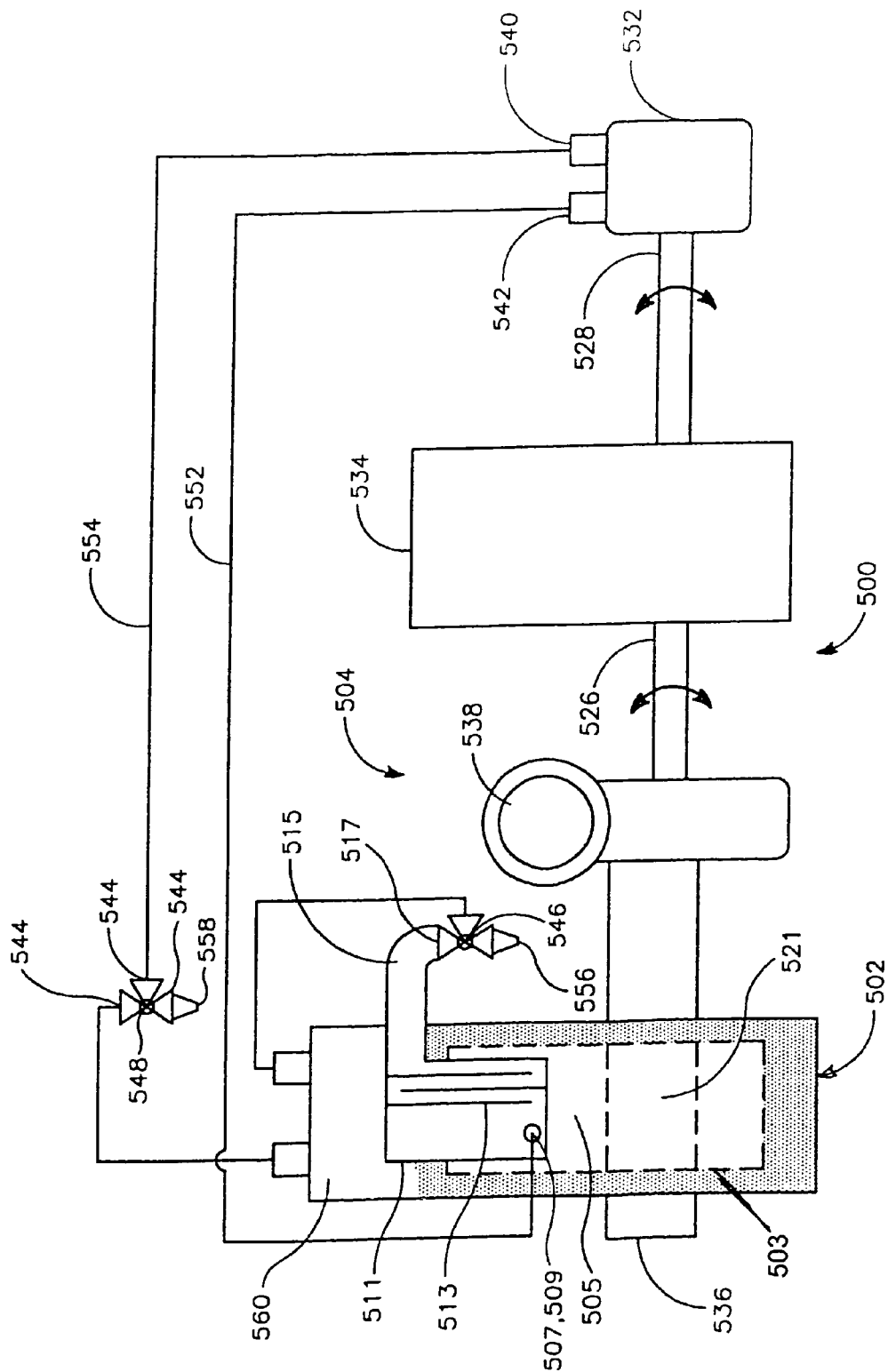
FIG. 17 is a diagrammatic representation of a pump assembly with pressure assisted back flush.

FIG. 17 is a diagrammatic representation of a pump assembly 500 with pressure assisted back flush. Pump assembly 500 includes a motor 534, a primary pump assembly 504, and a vacuum pump 532. Motor 534 includes a first drive shaft end 526 and a second drive shaft end 528. First drive shaft end 526 is coupled to primary pump assembly 504. Second drive shaft end 528 is coupled to vacuum pump 532.

Pump assembly 500 also includes a separator 502. A reservoir 560 of separator 502 is in fluid communication with primary pump assembly 504. Separator 502 includes an intake port 536 and primary pump assembly 504 includes an output port 538. Separator 502 also includes an inner tank 503 which is disposed within reservoir 560. Inner tank 503 defines a passageway 505 extending through reservoir 560. Passageway 505 is preferably fluidly isolated from reservoir 560 and thermally coupled to reservoir 560. Passageway 505 includes an inlet port 507 and an outlet port 509. Outlet port 509 of passageway 505 is in fluid communication with a muffler 511. In the embodiment of FIG. 17, muffler 511 includes a plurality of baffles 513 and an elbow 515 terminating with a muffler outlet 517.

Vacuum pump 532 includes an intake 540 and a discharge port 542. Intake 540 of vacuum pump 532 is in fluid communication with a port 544 of a second valve 548 via a second conduit 554. Discharge port 542 of vacuum pump 532 is in fluid communication with a port 544 of a first valve 546 via a first conduit 552, inlet port 507 of passageway 505, outlet port 509 of passageway 505, muffler 511, and muffler outlet 517.

In a preferred embodiment, first valve 546 and second valve 548 are three way valves. First valve 546 and second valve 548 may include various types of valves. Examples of valves that may be suitable include solenoid valves, air piloted valves, and manual valves. In a particularly preferred embodiment, first valve 546 and second valve 548 are coupled together so that they are actuated more or less simultaneously. In this preferred embodiment, first valve 546 and second valve 548 may be coupled together utilizing various methods of coupling. For example, first valve 546 and second valve 548 may be mechanically coupled, electrically coupled, and/or pneumatically coupled.

During a typical pumping operation utilizing pump assembly 500, the inlet of vacuum pump 532 may be coupled to reservoir 560 of separator 502 via second valve 548 and the outlet of vacuum pump 532 may be coupled to first valve vent 556 via first valve 546. During a pumping operation utilizing pump assembly 500, it may sometimes be desirable to back flush pump assembly 500. For example, inlet 536 of pump assembly 500 may be coupled to a proximal end of a hose and a strainer may be coupled to a distal end of the hose. Suction created at the distal end of the hose during a pumping operation may cause the strainer to become clogged. Back flushing may be utilized to un-clog the strainer.

To back flush pump assembly 500, first valve 546 maybe switched to place discharge port 542 of vacuum pump 532 in fluid communication with reservoir 560 of separator 502 closing vent 556. In a similar manner, second valve 548 may be switched to place intake 540 in fluid communication with second valve vent 558. In a preferred method of the present invention, first valve 546 and second valve 548 are switched substantially simultaneously. With first valve 546 and second valve 548 switched as described above, vacuum pump 532 may be used to increase the pressure in reservoir 560 sufficiently to back flush pump assembly 500. In a particularly preferred method of the present invention, the pressure in reservoir 560 is increased to about 14 psig. With the primary pump turned off, the effect of gravity on the pumped material may also help back flush the system.

Methods in accordance with the present invention have been envisioned in which various pressure sources may be utilized to pressurize reservoir 560. Examples of pressure sources which may be suitable in some applications include an air compressor, the discharge from a venturi system, and the discharge from an oil lubricated vacuum pump. Embodiments of the present invention have been envisioned in which first valve vent 556 includes a filter, and second valve vent 558 includes a filter.

In a preferred embodiment of pump assembly 500, inner tank 503 defines a lumen 521 which allows fluid within reservoir 560 to pass in a straight line from intake port 536 to primary pump assembly 504. In a preferred embodiment, the diameter of lumen 521 is similar to the diameter of an inlet of primary pump assembly 504 or the maximum diameter of the top of the impeller blades.

Figure 18:
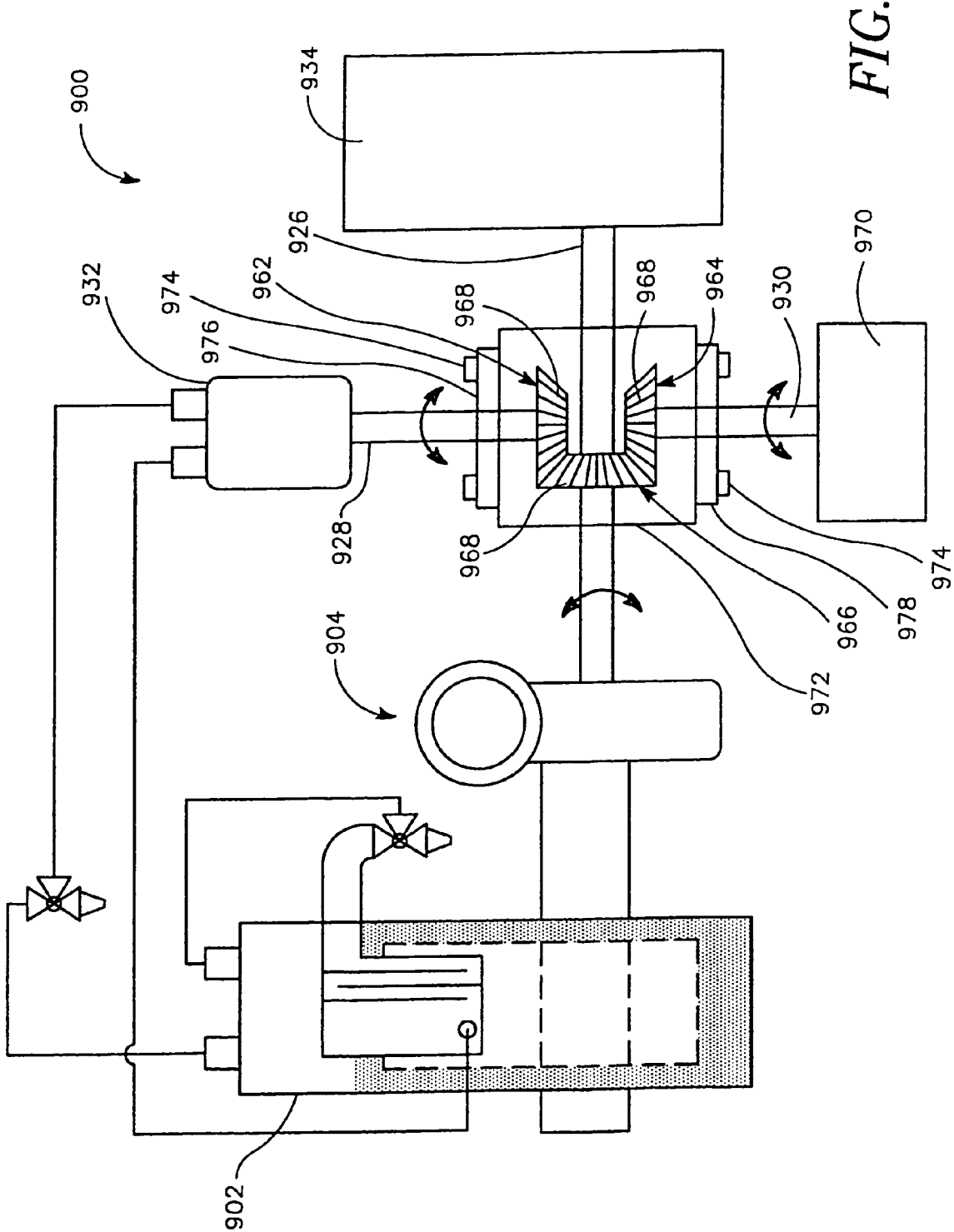
FIG. 18 is a diagrammatic representation of a pump assembly in accordance with an exemplary embodiment of the present invention.

FIG. 18 is a diagrammatic representation of an additional embodiment of a pump assembly 900 with bevel gear drives. Pump assembly 900 includes a separator 902, a primary pump assembly 904, a vacuum pump 932 and a motor 934. Motor 934 includes a first drive shaft end 926. First drive shaft end 926 is coupled to primary pump assembly 904. A bevel gear 966 having a plurality of gear teeth is disposed about first drive shaft end 926. A vacuum pump bevel gear 962 having a plurality of gear teeth 968 is disposed proximate bevel gear 966. Gear teeth 968 of vacuum pump bevel gear 962 are intermeshed with gear teeth 968 of bevel gear 966. Vacuum pump bevel gear 962 is fixed to a vacuum pump drive shaft end 928 which drives vacuum pump 932.

An accessory bevel gear 964 having a plurality of gear teeth 968 may also be disposed proximate bevel gear 966. Gear teeth 968 of accessory bevel gear 964 are intermeshed with gear teeth 968 of bevel gear 966. Accessory bevel gear 964 is fixed to an accessory drive shaft 930 that drives an accessory 970. Accessory 970 may include various pieces of equipment adapted to interface with a rotating shaft. For example, accessory 970 may comprise an electrical generator, another vacuum pump, an air compressor, a hydraulic pump, an air conditioning compressor, and the like.

In the embodiment of FIG. 18, pump assembly 900 includes a bevel gear box 972. A first access door 976 is fixed to bevel gear box 972 with a plurality of bolts 974. As shown in FIG. 18, vacuum pump bevel gear 962 is disposed within bevel gear box 972 and vacuum pump drive shaft 928 extends through first access door 976. First access door 976 may include a bearing disposed about the vacuum pump drive shaft 928, if desired.

A second access door 978 may also be fixed to bevel gear box 972 with a plurality of bolts 974. As shown in FIG. 18, accessory bevel gear 964 is disposed within bevel gear box 972 and accessory drive shaft 930 extends through second access door 978. Second access door 978 may include a bearing disposed about accessory drive shaft 930, if desired. First access door 976 and/or second access door 978 maybe selectively replaced with a blank access door when not in use.

Turning now to a trailer assembly that can be used to transport pump assemblies such as those described herein. FIG. 19 shows a partial cross-sectional side view of a preferred single axle trailer assembly, and FIG. 21 is a partial cross-sectional side view of a preferred two axle trailer assembly. The trailer assembly is generally shown at 298, and includes a fuel tank 200 with a lower track bar 202 and an optional upper track bar 204. The lower track bar preferably extends across the front, back, and down the sides of the fuel tank 200, as more clearly shown in FIG. 28. The fuel tank 200 provides most of the support for the trailer assembly 298.

The lower track bar 202 is preferable a hollow elongated support member with a slot extending through the lower side thereof. By placing an insert inside of the hollow support member and bolting a peripheral component such as a trailer tongue 208, a jack stand 210, an axle 212, a fender, etc., to the insert through the longitudinally extending slot, the peripheral components can be easily attached to the fuel tank 200. In addition, because the slot extends along the length of the track bar 202 (either the complete length or a portion thereof), the peripheral component can be selectively attached anywhere along the track bar. This may allow optimum placement of the peripheral components along the length of the trailer. For example, the axle 212 may be placed along the length of the trailer to provide an ideal tongue weight.

The lower track bar 202 may also provide a number of other benefits. For example, the lower track bar 202 may provide additional strength to the fuel tank 200. The lower track bar 202 may also serve as a base when setting the fuel tank 200 on the ground. The lower track bar 202 may be utilized to fix fuel tank 200 to a truck bed or other mounting surface.

The optional upper track bar 204 operates in a similar manner. In FIG. 21, a lifting bail is attached to the upper track bar 204 for lifting the trailer (and pump assembly when so provided) via a crane or the like. Unlike the lower track bar 202, the slot in the upper track bar 204 extends through the upper side surface thereof.

Many trailers have some or all of the peripheral components pre-welded to the trailer frame. It has been recognized, however, that this tends to increase shipping costs, particularly when the shipping costs are dependent on the overall volume occupied by the trailer assembly. Because the track bar 202 allows all or most of the peripheral components to be easily bolted onto the trailer after shipping, the overall volume and thus the cost of shipping the trailer can be significantly reduced.

Figure 22:
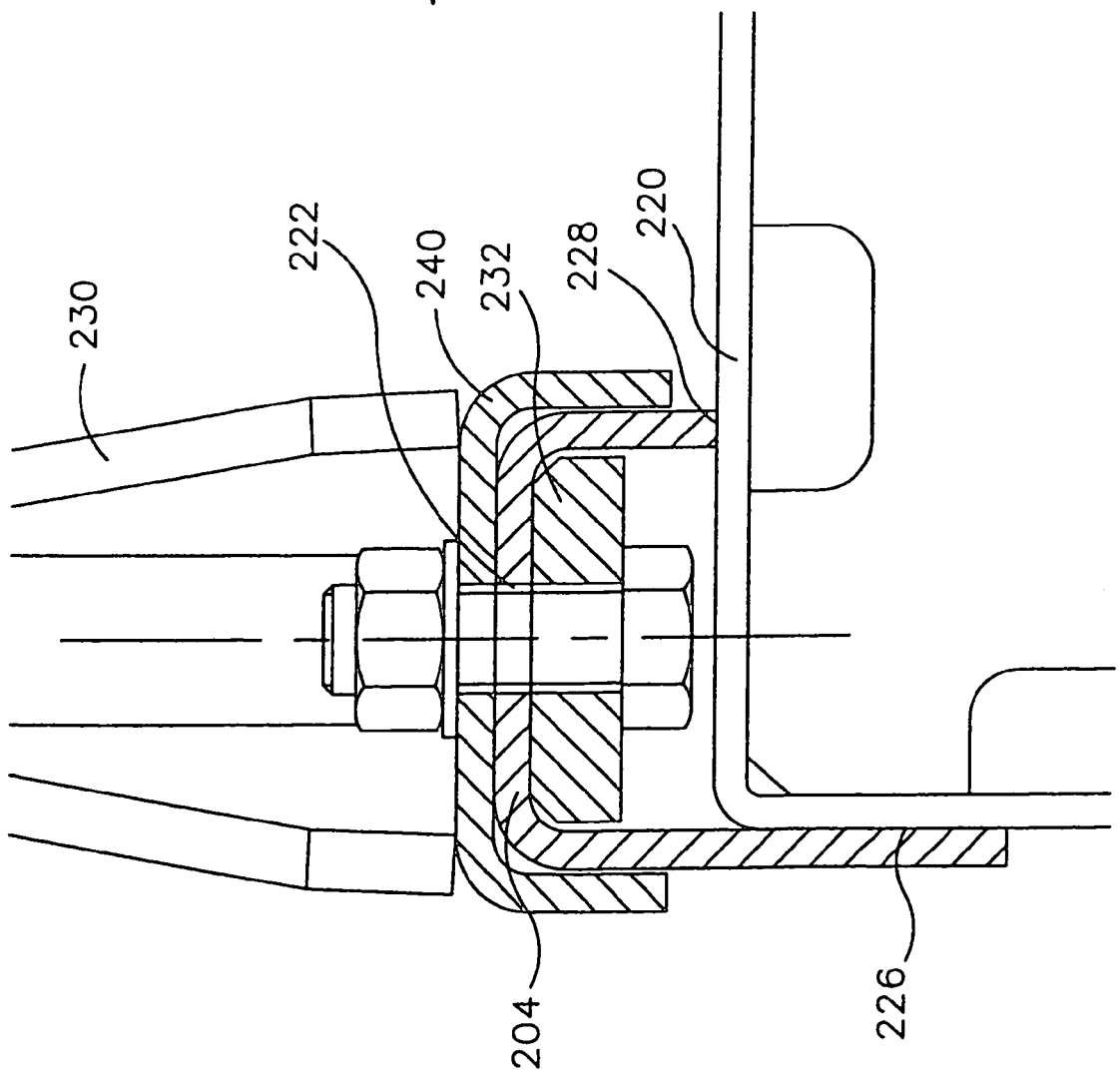
FIG. 22 is a partial cross-sectional side view of an attachment mechanism for attaching the lifting bail to the upper track bar of the trailer assembly of FIG. 19.

FIG. 22 is a partial cross-sectional side view of an attachment mechanism for attaching the lifting bail to the upper track bar 204 of the trailer assembly of FIG. 19. The upper track bar 204 is shown attached to the fuel tank 200 at locations 226 and 228. The upper track bar 204 is shown as a hollow elongated support member with a slot 222 extending through the upper side thereof.

The lifting bail 230 is attached to the upper track bar 204 by first providing insert 232 inside the hollow support member 204. The lifting bail 230 is then bolted to the insert 232 through slot 222, as shown. The lower portion of the lifting bail 230 may have a lower support 240. Lower support 240 extends around the sides of upper track bar 204 to provide added lateral support. Because the slot 222 extends along the length of the track bar 204, the lifting bail can be selectively positioned along the track bar. This may allow the lifting bail to be placed at an optimum balancing location so that the trailer and pump assembly are properly balanced when lifted. Also, the upper trackbox 204 may be constructed similar to the lower trackbox discussed above.

Figure 23:
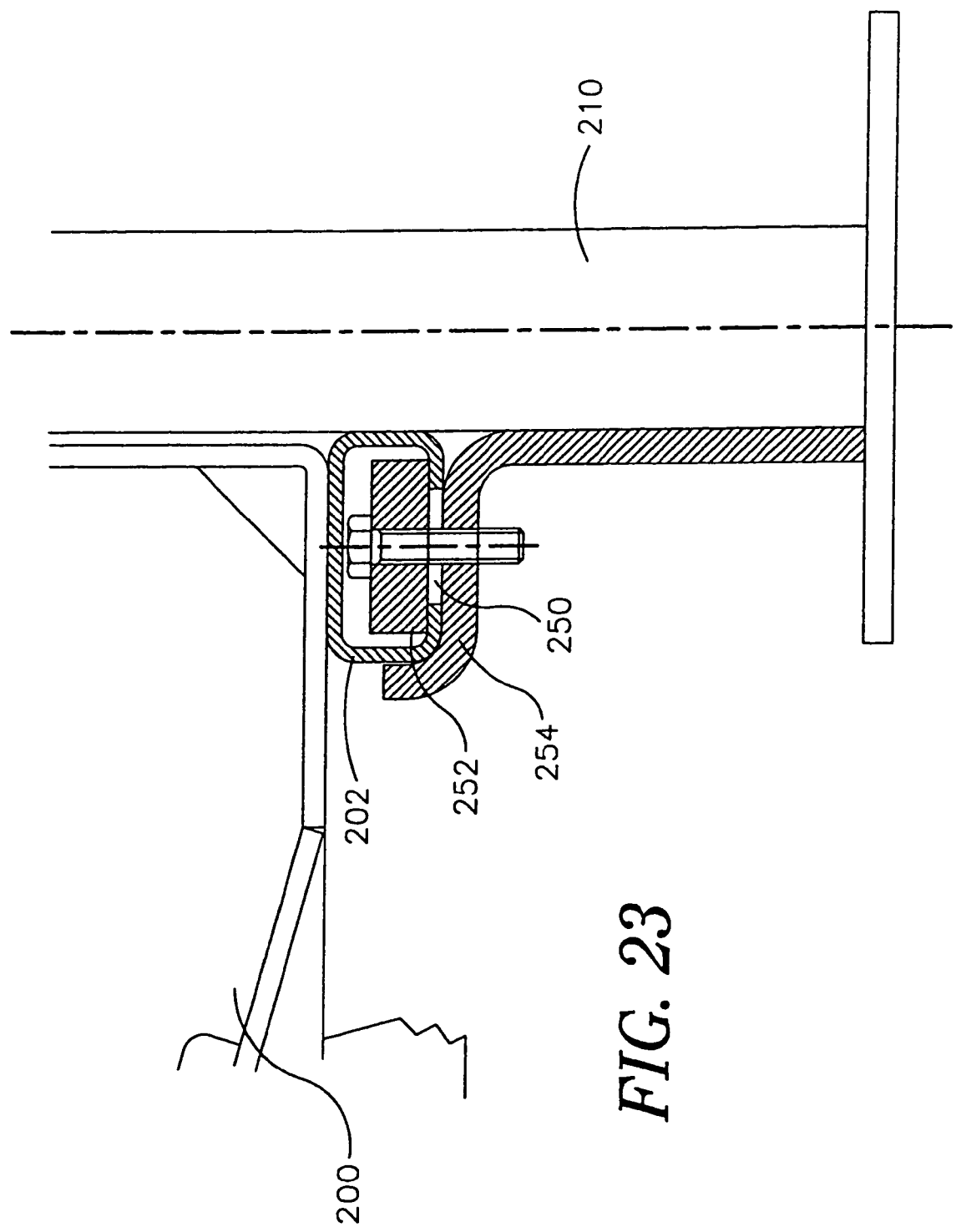
FIG. 23 is a partial cross-sectional side view of an attachment mechanism for attaching a jack stand to the bottom track bar of the trailer assembly of FIG. 19.

FIG. 23 is a partial cross-sectional side view of an attachment mechanism for attaching a jack stand 210 to the bottom track bar 202 of the trailer assembly. The lower track bar 202 is shown as a hollow elongated support member with an elongated slot 250 extending through the lower side thereof. Jack stand 210 is attached to the fuel tank 200 by placing an insert 252 inside the hollow support member 202, and bolting the jack stand support member 254 to the insert 252 through the slot 250. Because the slot extends along the length of the track bar 202, the jack stand 210 can be selectively attached anywhere along the track bar 202. The upper track bar 204 can be extended the full length of the fuel tank 200, and may be used to attach, for example, a debris cover over the top of the pump, a protective cover made from a wire mesh, or a sound attenuating cover.

Figure 24:
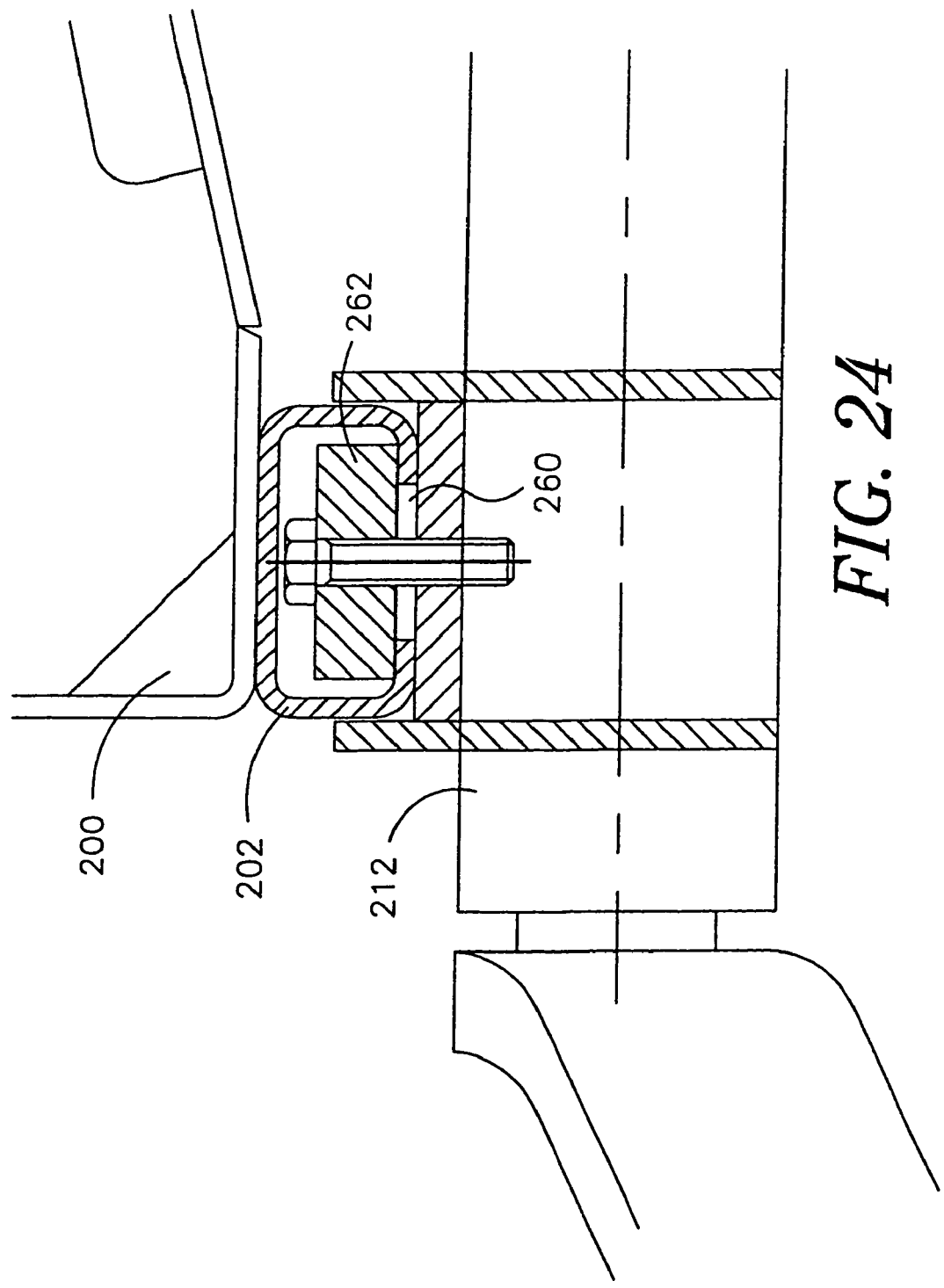
FIG. 24 is a partial cross-sectional side view of an attachment mechanism for attaching the axle assembly to the bottom track bar of the trailer assembly of FIG. 19.

FIG. 24 is a partial cross-sectional side view of an attachment mechanism for attaching the axle assembly 212 to the bottom track bar 202 of the trailer assembly. Like above, the lower track bar 202 is shown as a hollow elongated support member with a slot 260 extending through the lower side thereof. Axle 212 is attached to the fuel tank 200 by placing an insert 262 inside the hollow support member 202, and bolting the axle 212 to the insert 262 through the slot 260. Because the slot extends along the length of the track bar 202, the axle 212 can be selectively attached anywhere along the track bar 202. This may allow the optimum placement of the axle 212 along the length of the trailer. For example, the axle 212 may be placed along the length of the trailer to provide an ideal tongue weight.

Figure 25:
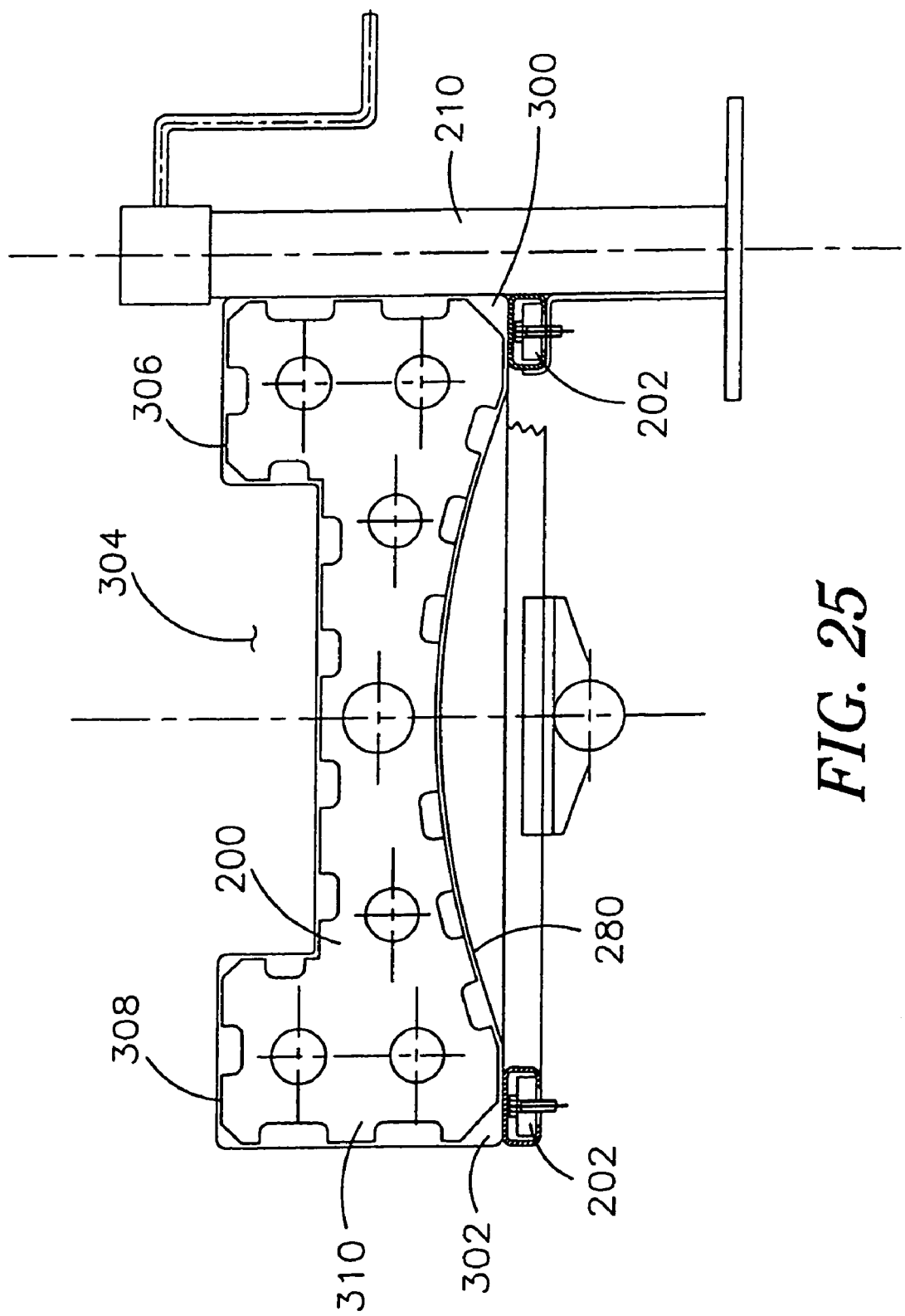
FIG. 25 is a partial cross-sectional rear view of the trailer and fuel tank of FIG. 19.

FIG. 25 is a partial cross-sectional rear view of the trailer and fuel tank 200 of FIG. 19. As indicated above, the fuel tank 200 preferably provides a majority of the support to the trailer assembly. To help increase the rigidity of the fuel tank 200, the upper portion of the fuel tank assumes one-half of an I-beam type configuration including a recessed portion 304 that extends between two elevated portions 306 and 308. This construction is believed to significantly increase the rigidity of the fuel tank 200.

In addition, the bottom surface of the fuel tank 200 is preferably curved upward, as shown. This provides a number of benefits. First, the curved lower surface 280 of the fuel tank 200 helps increase the rigidity and strength of the fuel tank 200. Second, the curved lower surface 280 causes any water, sediment or other contaminates that enters the fuel tank 200 to settle along either side of the fuel tank. Flush ports (not shown) are then provided at the lower side portions 300 and 302 of the fuel tank 200 to help remove the collected water, sediment or contaminates from the fuel tank.

The fuel tank 200 may have a number of baffles, such as baffle 310. These baffles help reduce rapid movement of the fuel within the fuel tank 200. This may help the trailer assembly handle better when moved. The baffles also help provide added rigidity and strength to the fuel tank 200.

It is contemplated that the separator 10, primary pump assembly 12, motor 16 and vacuum pump 14 may be directly mounted to the fuel tank 200, and preferably within the recessed portion 304 of the fuel tank 200. By mounting the primary pump assembly 12 in the recessed portion 304 of the fuel tank, the primary pump assembly 12 can be located closer to the ground, thereby increasing the effective suction performance of the pump.

Figure 26:
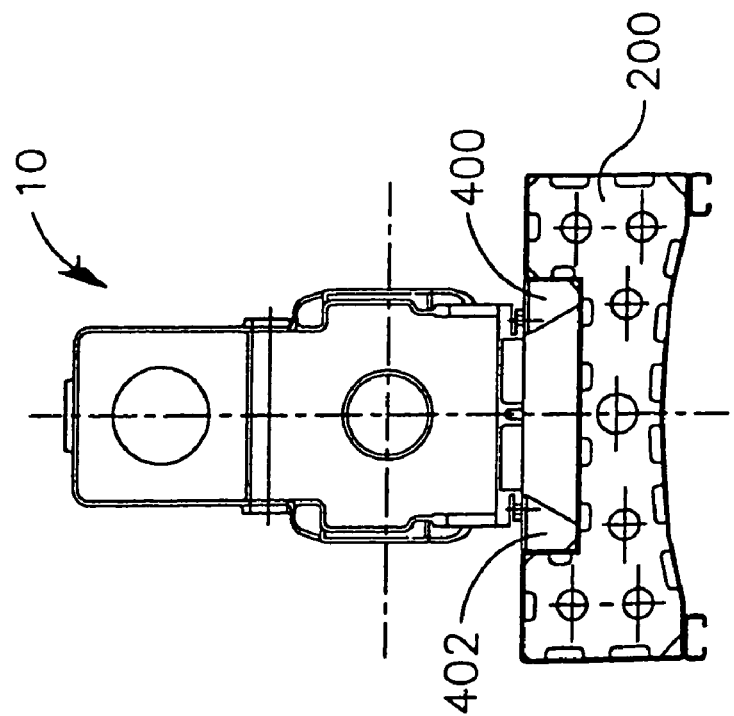
FIG. 26 is a partial cross-sectional rear view of the fuel tank with a separator mounted thereon.

FIG. 26 shows the fuel tank 200 with the separator 10 mounted thereto. The separator is preferably bolted to mounting brackets 400 and 402. Mounting brackets 400 and 402 are preferably welded to the fuel tank 200.

Figure 27:
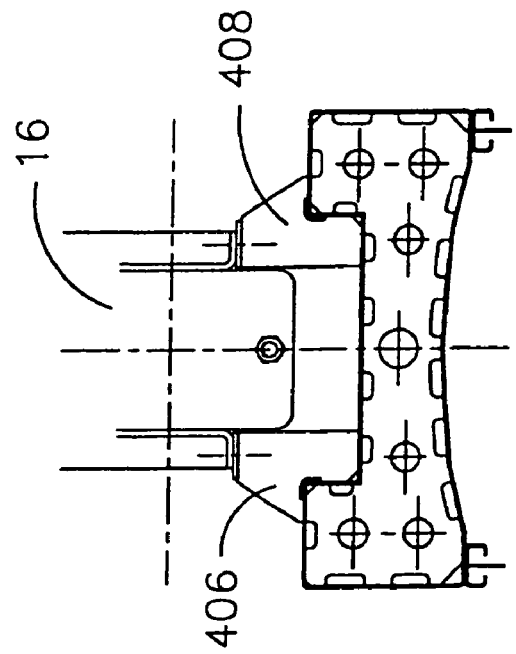
FIG. 27 is a partial cross-sectional rear view of the fuel tank with a motor mounted thereon.

FIG. 27 is a cross-sectional side view of fuel tank 200 with motor 16 mounted there to. Motor 16 is preferably bolted to mounting brackets 406 and 408. Mounting brackets 406 and 408 are also preferably welded to the fuel tank 200. The liquid ring vacuum pump assembly 14 may be similarly attached.

Figure 28:
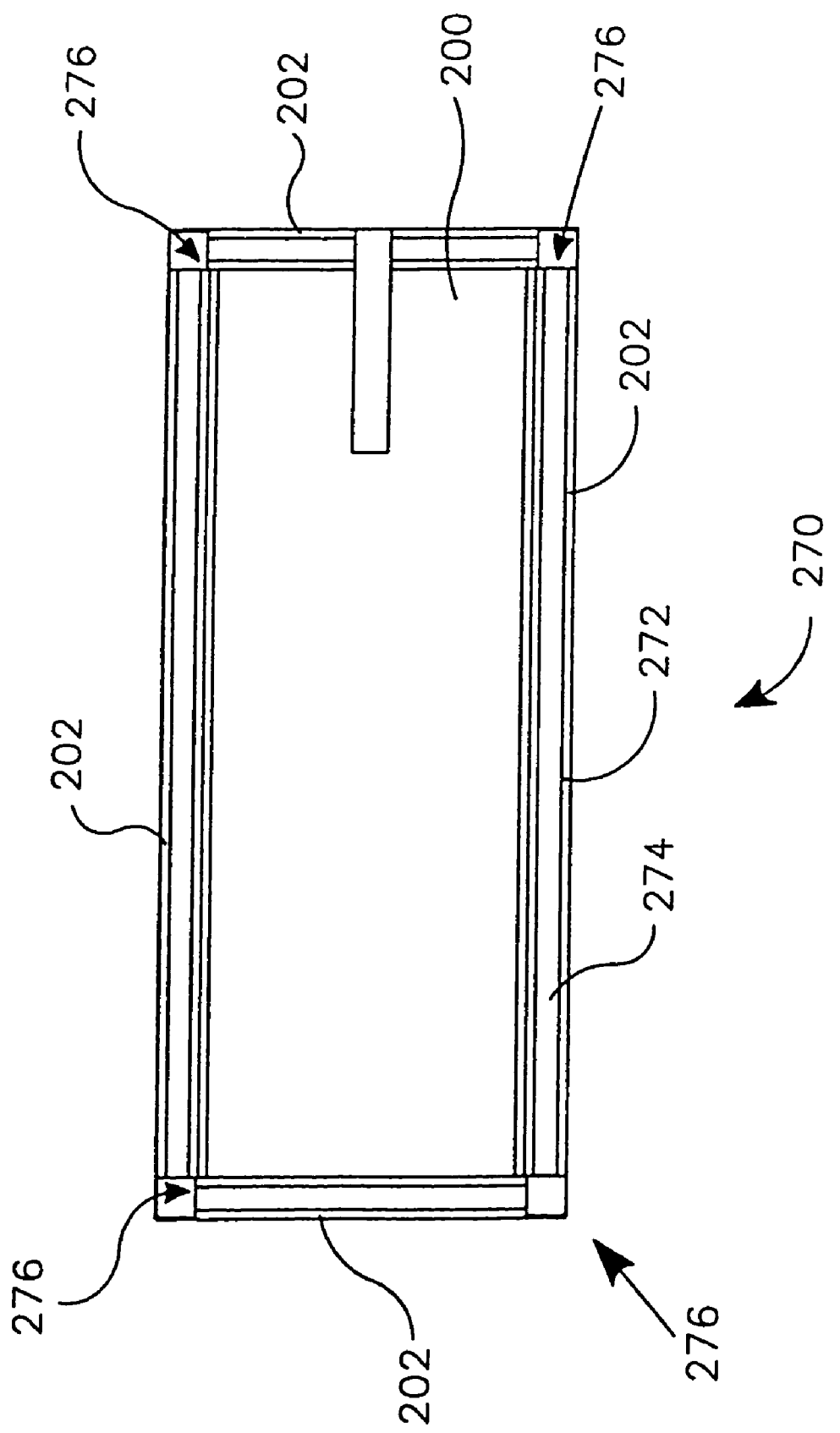
FIG. 28 is a plan view of a trailer in accordance with an exemplary embodiment of the present invention.

FIG. 28 is a plan view of an additional embodiment of a trailer 270 in accordance with the present invention. Trailer 270 includes a fuel tank 200 and a plurality of lower track bars 202. Lower track bars 202 extend across the front and down the sides of fuel tank 200. Each lower track bar 202 includes a slot 272 into a channel 274. Each lower track bar 202 preferably terminates before reaching the end of fuel tank 200. This allows an insert to be inserted into the channel 274 of any lower track bar 202 proximate the corner 276. Trailer 270 also includes a square receiving tube 278 which is fixed to tank 200. Square receiving tube 278 defines a cavity 279 for receiving a trailer tongue assembly.

Figure 29:
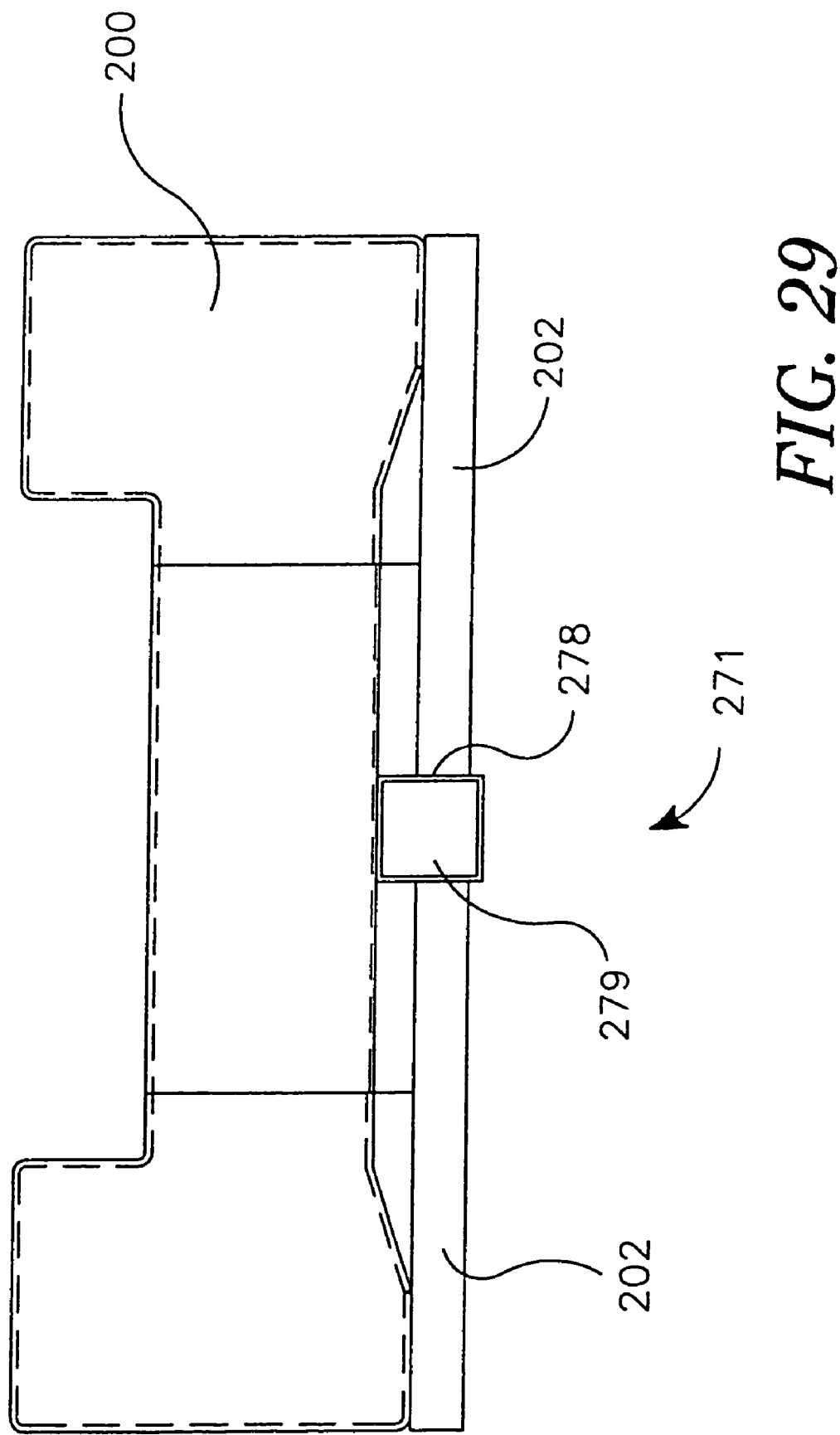
FIG. 29 is a plan view of an assembly in accordance with an additional exemplary embodiment of the present invention.

FIG. 29 is a plan view of an assembly 271 in accordance with the present invention. Assembly 271 includes a fuel tank 200 and a plurality of lower track bars 202. In the embodiment shown, lower track bars 202 extend across the front of the fuel tank 200. Assembly 271 also shows a square receiving tube 278 which is fixed to tank 200. Square receiving tube 278 defines a cavity 279 for receiving a trailer tongue assembly (not shown). In FIG. 29 it may be appreciated that the bottom surface of square receiving tube 278 is generally flush with the bottom surface of lower track bars 202. This may allow the assembly to have a relatively flat base which helps provide stability when the assembly 271 is placed on the ground or on the bed of a truck. Further, the trailer tongue assembly can remain installed in cavity 279 even when the assembly 271 is placed on the ground.

Figure 30:
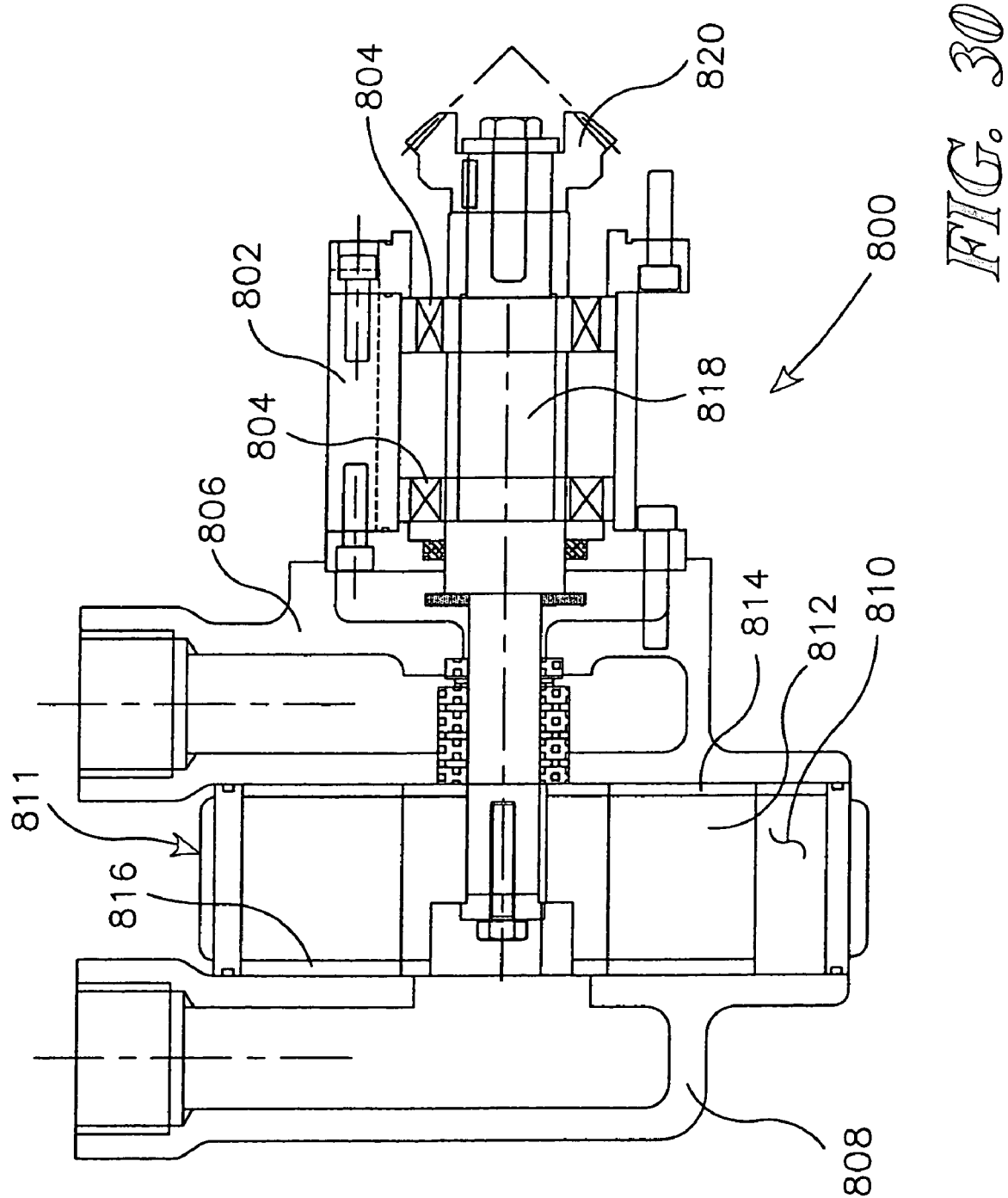
FIG. 30 is a cross-sectional side view of a vacuum pump assembly in accordance with an exemplary embodiment of the present invention.

FIG. 30 is a cross-sectional side view of a vacuum pump assembly 800 in accordance with the present invention. Vacuum pump assembly 800 includes a bearing housing 802 including a plurality of bearings 804. Bearing housing 802 is fixed to a drive side housing 806. Drive side housing 806 is fixed to an outside housing 808. Drive side housing 806 and outside housing 808 define an impeller chamber 810. An impeller 812 is disposed in impeller chamber 810 between a first port plate 814 and a second port plate 816. First port plate 814 is preferably fixed to drive side housing 806 and second port plate 816 is preferably fixed to outside housing 808. Impeller 812 is fixed to a drive shaft 818 proximate it's distal end. Drive shaft 818 extends through drive side housing 806 and bearing housing 802. A bevel gear 820 is fixed to drive shaft 818 proximate it's proximal end.

In the vacuum pump 800, the air flows through the pump in a common direction. For example, the air may be drawn into the vacuum pump through the drive side housing 806, through the first port plate 814, between the vanes of the impeller, through the second port plate 816 and finally out the outside housing 808. In this example, and unlike the vacuum pump shown in FIGS. 12–16, the air flows generally from right-to-left in the diagraph shown in FIG. 30. This may be more efficient that having the air flow in and out from a common side of the vacuum pump. In addition, it is contemplated that the air flow channels may be made smooth, such as by polishing the inside surfaces of the vacuum pump or by applying a coating or the like. This may further increase the efficiency of the vacuum pump.

To change the capacity of the vacuum pump 800, it is contemplated that only two parts need to be changed; the impeller 812 and the cover 811. For more capacity, the impeller 812 is replaced with an impeller that has wider vanes. To accommodate the wider vanes, a wider cover 811 can be provided between the drive side housing 806 and the outside housing 808. Conversely, for less capacity, the impeller 812 can be replaced with an impeller with narrower vanes. To accommodate the narrower vanes, a shallower cover 811 may be provided. Under some circumstances, such as when a large capacity change is desired, it also maybe desirably to change the port plates 814 and 816 to increase or decrease the size or shape of the intake and/or discharge ports, as desired.

Figure 32:
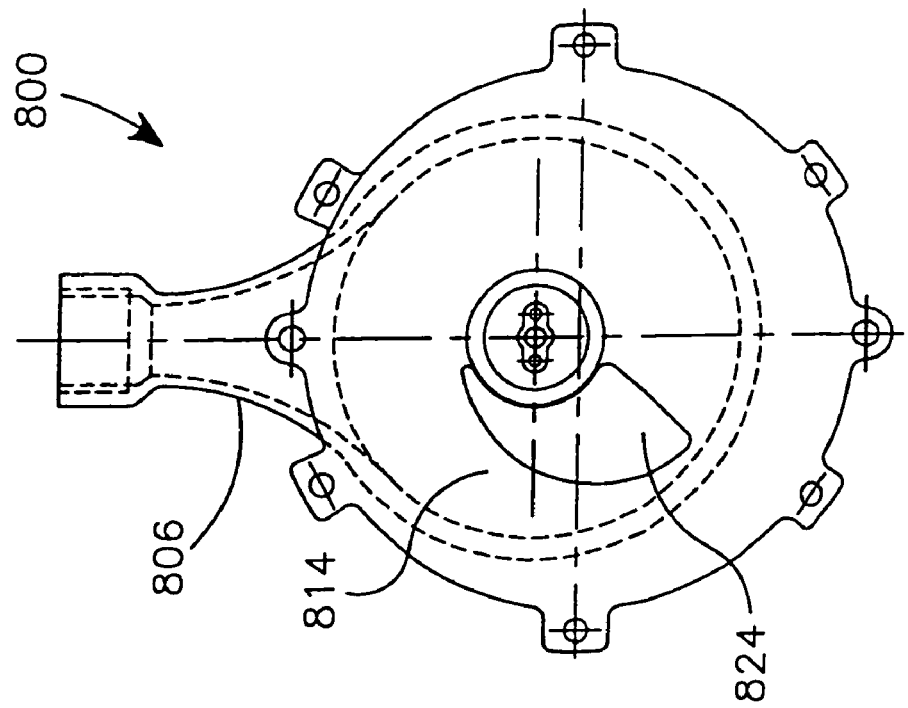
FIG. 32 is a plan view of an assembly in accordance with the present invention including a drive side housing and a port plate.
Figure 31:
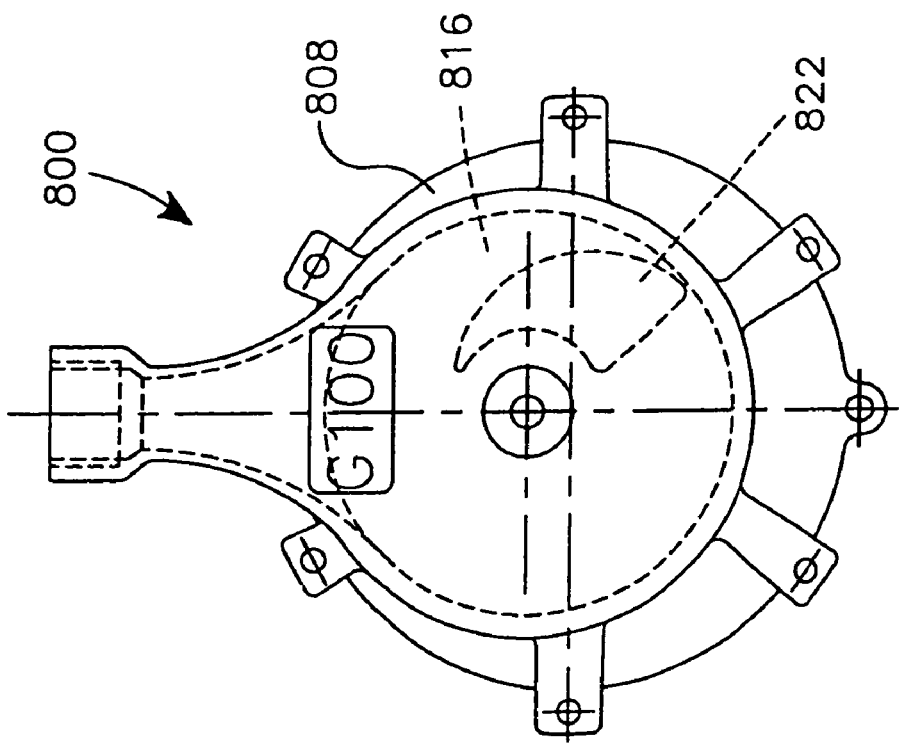
FIG. 31 is a plan view of vacuum pump assembly of FIG. 30.

FIG. 31 is a plan view of vacuum pump assembly 800 of FIG. 30. Outside housing 808 of vacuum pump assembly 800 is visible in FIG. 31. In FIG. 31 it may be appreciated that second port plate 816 defines a second port 822. FIG. 32 is a plan view of an assembly including drive side housing 806 and first port plate 814. In FIG. 32 it may be appreciated that first port plate 814 defines a first port 824.

Figure 33:
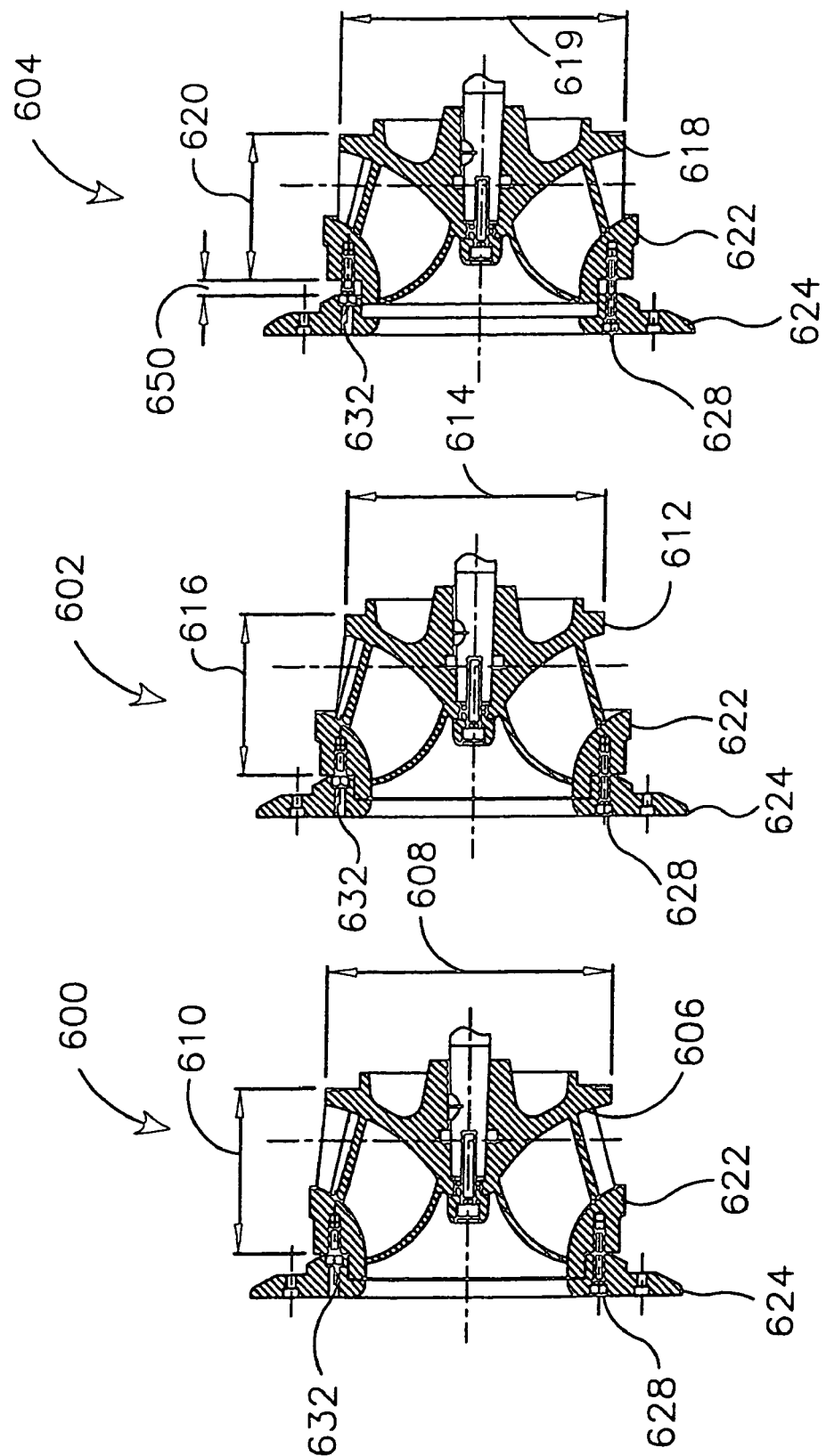
FIG. 33 is a cross sectional view of a first assembly, a second assembly, and a third assembly in accordance with the present invention.

FIG. 33 is a cross-sectional view of a first assembly 600, a second assembly 602, and a third assembly 604. Assembly 600 includes an impeller 606 having a maximum diameter 608 and a maximum height dimension 610. This configuration provides maximum head, maximum solids and maximum flow. This configuration may be used when maximum performance in all areas is desired. Assembly 602 includes an impeller 612 having a minimum diameter 614 and a maximum height dimension 616. This configuration provides lower head, maximum solids and lower flow, and may require more power than assembly 600. This configuration may be used when maximum solid passage is less important than head or flow. Finally, assembly 604 includes an impeller 618 having a maximum diameter 619 and minimum height dimension 620. This configuration provides maximum head, smaller solids and lower flow, and may require less power than assembly 600. This configuration may be used when maximum head is more important than solid passage. Other configurations are also contemplated.

This diagram illustrates that the same volute and front wear plate can be used in conjunction with many different impeller configurations. This may minimize the time and cost of changing the impeller, and thus the pump characteristics.

As indicated above, the position of front plate 622 may be adjusted either toward or away from the impeller. In this embodiment, the front wear plate 622 is made adjustable more than is necessary to accommodate wear of the impeller. Rather, the front wear place 622 is made to be sufficiently adjustable to accommodate various different impellers. In a preferred embodiment, the width of gap 650 may vary from about 0 inches to about 1.0 inch or more, and more preferably between about 0 inches to about 0.5 inches. This range is typically sufficient to accommodate a sufficient variety of impellers to achieve most pumping needs.

Another feature of the present invention is that the back wear plate (see FIG. 3) is fixed to the volute. This may allow a pump accommodate impellers that have differing diameters. One reason for this is that the back wear plate may allow the impeller to extend laterally beyond the back plate and into the volute, thereby providing added flexibility in selecting impellers.

Figure 34:
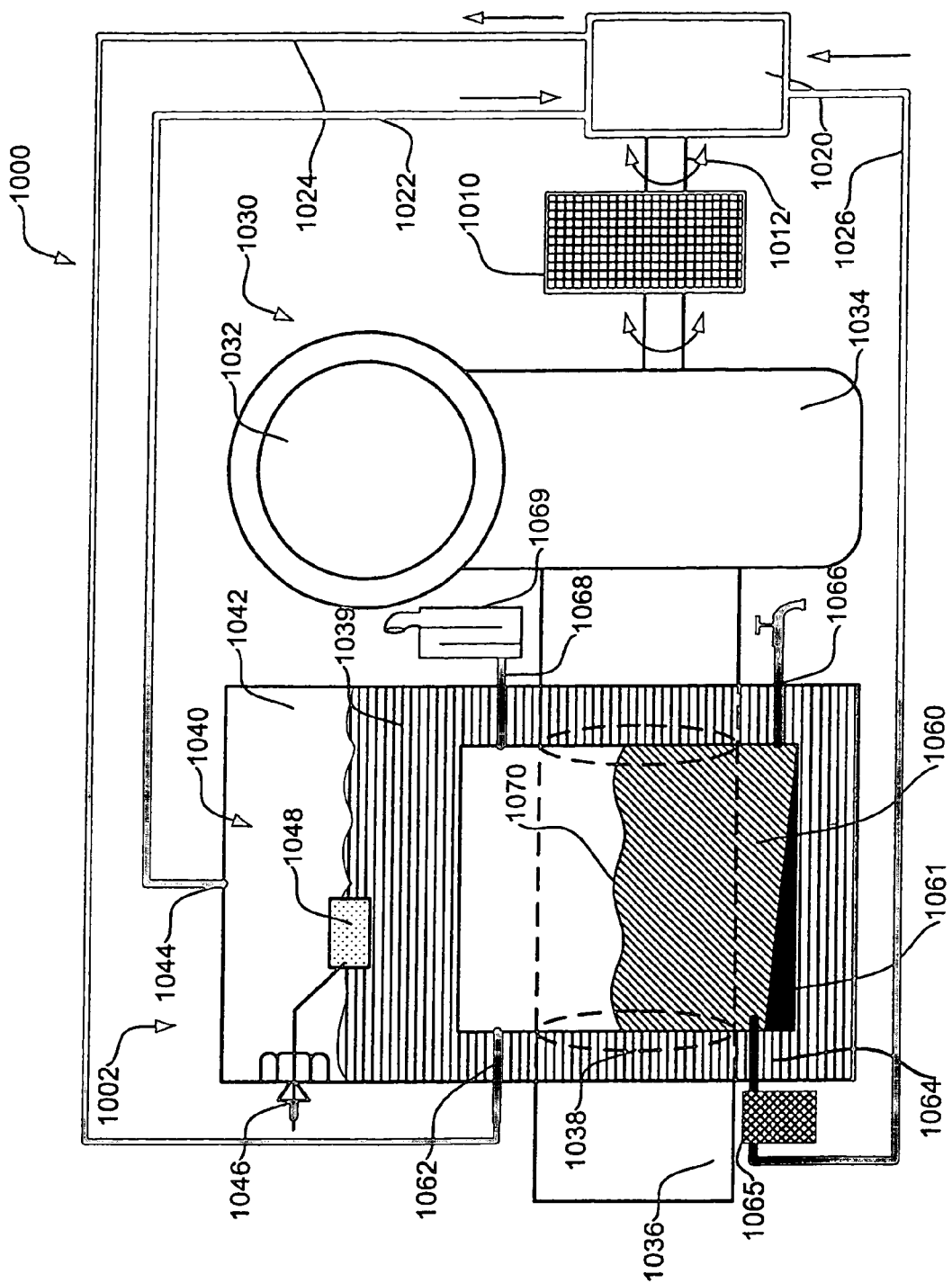
FIG. 34 is a schematic diagram showing several embodiments of the present invention.

FIG. 34 is a schematic diagram showing several features of the present invention. A self-priming pump system is generally shown at 1000. An engine 1010 provides power via drive shaft 1012 to vacuum pump 1020 and main pump 1030. Vacuum pump 1020 is preferably a liquid ring vacuum pump, and includes a vacuum input port 1022, an exhaust port 1024, and a liquid inlet port 1026. Some illustrative variations to this general schematic are discussed above, and additional details of some illustrative embodiments of the present invention are further explained below.

Main pump 1030 includes a main pump output 1032, which is in fluid communication with an impeller and volute section 1034. Main pump 1030 also has a main input port 1036, which receives pumped fluid preferably via a hose or the like (not shown). Feeding the impeller and volute section 1034 is a separator 1002. Separator 1002 preferably defines a reservoir tank 1040 which holds pumped fluid.

During operation, pumped fluid enters the main input 1036, and in some embodiments, passes through a cylindrical passageway 1038 extending through an inner tank 1060 located in the reservoir tank 1040. In some embodiments, the cylindrical passageway 1038 in the inner tank 1060 is adapted to be in registration with and have a similar diameter and shape as the main input 1036 and the intake port of the impeller and volute section 1034.

The reservoir tank 1040 preferably includes an upper outlet 1044, which is in fluid communication with the inlet 1022 of the vacuum pump 1020. Vacuum pump 1020 provides vacuum suction to the reservoir tank 1040 through upper outlet 1044 to raise the level of the reservoir fluid 1039. This primes the main pump 1030, at least under neutral or negative head pressures. Reservoir fluid 1039 may remain in reservoir tank 1040 for some time, or may circulate and eventually pass into the impeller and volute section 1034 of the main pump 1030.

A float 1048 or the like is preferably included in the reservoir tank 1040 to measure or detect the level of the reservoir fluid 1039 in the reservoir tank 1040. Other devices, including electronic sensors and/or mechanical or electro-mechanical sensors, may be used either in conjunction with or as substitute(s) for the float 1048. Under neutral or negative head pressures, float 1048 preferably controls a valve 1046, which selectively allows air into the reservoir tank 1040 when the reservoir fluid 1039 level exceeds a predetermined maximum level. For positive head pressures, valve 1046 may be a 1-way valve to prevent the pumped fluid from escaping from the reservoir tank 1040, as further explained below with reference to FIG. 37.

Under some pumping conditions (such as with large negative head pressures), the vacuum pump may remove air from the reservoir tank 1040 faster than the pump can pump the fluid from the reservoir tank 1040. To help under these conditions, the size/capacity of the valve 1046 may be greater than or equal to the pumping capacity of the vacuum pump. In some cases, the size/capacity of the valve 1046 may be less than the pumping capacity of the vacuum pump, but large enough to make up for the difference between the pumping capacity of the vacuum pump and the amount of fluid that can be pumped by the pump from the reservoir tank under all anticipated head pressures.

The inner tank 1060 preferably holds liquid 1070 for feeding the liquid ring vacuum pump 1020. The inner tank 1060 may be partly or entirely submerged by the reservoir fluid 1039, and in some embodiments, inner tank 1060 operates as a heat exchanger between the liquid 1070 and the reservoir fluid 1039. The inner tank 1060 may be single tank as shown, multiple tanks, a coiled tube or any other suitable heat exchanger. In addition, the inner tank 1060 may include heat sink fins or the like to help increase the inner and/or outer surface area of the inner tank 1060.

While the inner tank 1060 is shown disposed within the reservoir tank 1040, it is contemplated that inner tank 1060 may be provided outside of the reservoir tank 1040, if desired. For example, the inner tank 1060 may be located outside of the reservoir tank 1040 but thermally coupled to the reservoir tank 1040. Alternatively, or in addition, the inner tank may be a radiator or the like positioned away from the reservoir tank 1040, which may remove heat from the liquid 1070 that feeds the liquid ring vacuum. The radiator may be cooled with air, water or any other cooling gas or fluid.

Inner tank 1060 preferably includes an inlet line 1062 for receiving the exhaust 1024 from the liquid ring pump 1020. The inner tank 1060 also preferably includes a first outlet 1064, a second outlet 1066, and a third outlet 1068. The first outlet 1064 is connected to the liquid feeder line 1026 of the vacuum pump 1020, sometimes through a filter 1065. The filter 1065 may be included to remove residues, sediments, or undesired impurities from liquid 1070 before liquid 1070 reaches the vacuum pump 1020. A valve (not shown) maybe included for controlling whether, when, and what quantity of liquid 1070 is fed through liquid feeder line 1026 into vacuum pump 1020. Alternatively, the relative elevation of the inner tank 1060 and vacuum pump 1020 may be such that a proper level of fluid is maintained in the vacuum pump by simply maintaining a proper level of fluid in the inner tank 1060.

The second outlet 1066 in the illustrative embodiment is connected to a spigot or valve, as shown. Sediment that settles near second outlet 1066 may be selectively flushed out of inner tank 1060 by opening the spigot or valve on second outlet 1066. In some embodiments, the base 1061 and/or sides of the inner tank 1060 may be configured to encourage sediment to settle in an area near second outlet 1066. In the illustrative embodiment, the base 1061 is shown sloped down from the first outlet 1064 to the second outlet 1066. This helps encourage sediment to settle adjacent the second outlet 1066.

The third outlet 1068 is preferably positioned above the expected fluid or liquid level in the inner tank 1060, and provides a release to atmosphere for the exhaust gases provided by the discharge of the vacuum pump 1020. The third outlet 1068 may include one or more baffles or a muffler 1069, as shown.

Figure 35:
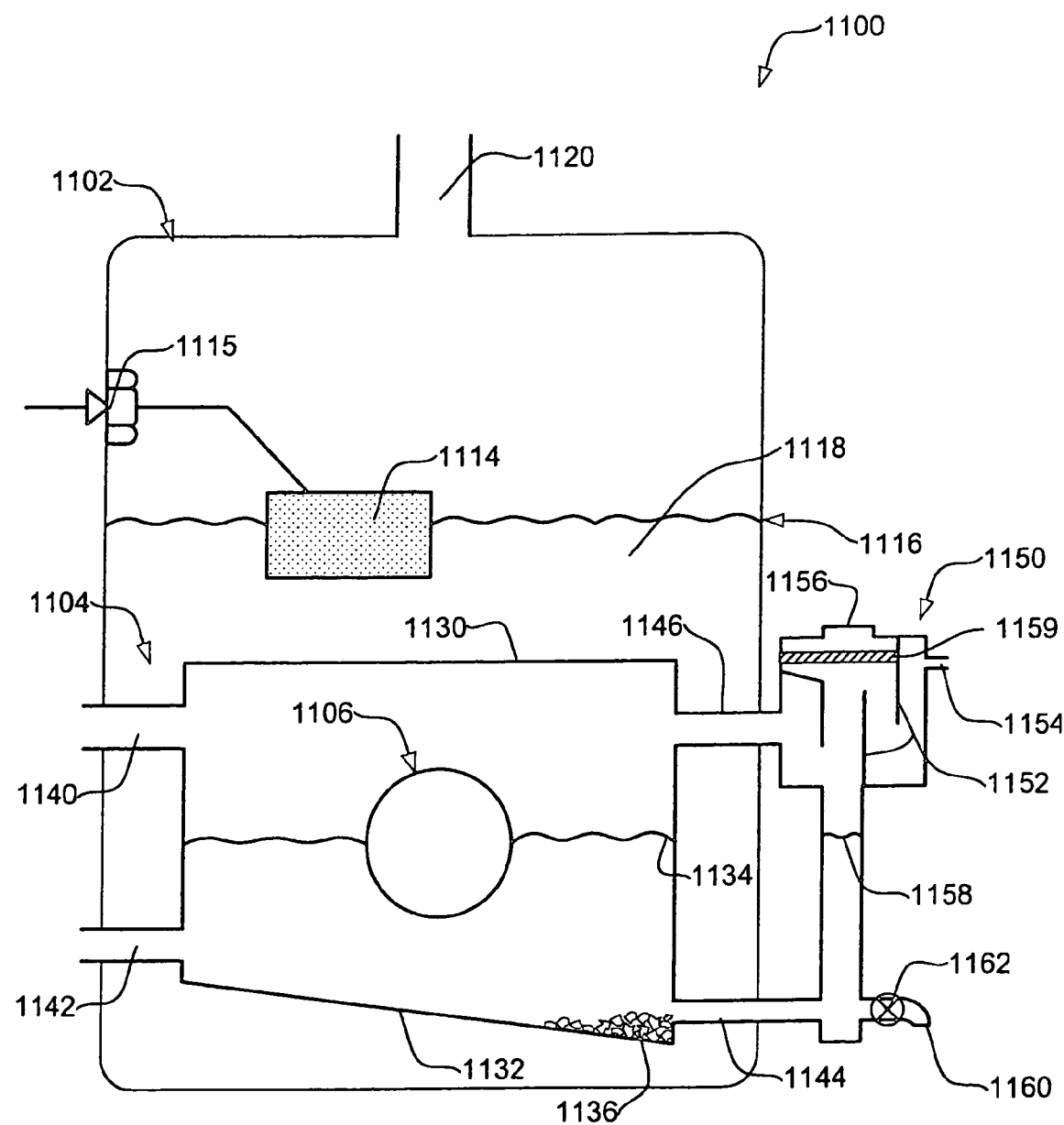
FIG. 35 is a schematic cross-sectional side view of an illustrative separator in accordance with the present invention.

FIG. 35 is a schematic cross-sectional side view of an illustrative separator in accordance with the present invention. Separator 1100 includes a reservoir tank 1102. An inner tank 1104 is positioned inside reservoir tank 1102. Preferably, the inside cavity of the inner tank 1104 is fluidly isolated from the reservoir tank 1102. A cylindrical section 1106 may pass through inner tank 1104 to provide a passageway for the pumped fluid to flow from the main pump input 1036, through the separator 1100, and into the impeller and volute section 1034 (see FIG. 34).

The reservoir tank 1102 preferably includes an upper outlet 1120, which is in fluid communication with the inlet of a vacuum pump (not shown). The vacuum pump provides vacuum suction to the reservoir tank 1102 through upper outlet 1120 to raise the level of the reservoir fluid 1118 to prime the main pump 1030, at least under neutral or negative head pressures. Reservoir fluid 1118 may remain in reservoir tank 1102 for some time, or may circulate and eventually pass into the impeller and volute section of the main pump.

A float 1114 or the like is preferably included in the reservoir tank 1102 to measure or detect the level 1116 of the reservoir fluid 1118 in the reservoir tank 1102. Other devices, including electronic sensors and/or mechanical or electro-mechanical sensors, may be used either in conjunction with or as substitute(s) for the float 1114. Under neutral or negative head pressures, float 1114 preferably controls a valve 1115, which selectively allows air into the reservoir tank 1102 when the reservoir fluid 1118 level exceeds a desired fluid level. For positive head pressures, valve 1115 is preferably a 1-way valve, as further explained below with reference to FIG. 37.

While inner tank 1130 is shown to be disposed within the reservoir tank 1102, it is contemplated that inner tank 1130 may be located outside of reservoir tank 1102, if desired. Preferably, the inner tank 1130 holds liquid 1134 for feeding a liquid ring vacuum pump. The inner tank 1130 may be partly or entirely submerged by the reservoir fluid 1118, and in some embodiments, inner tank 1130 operates as a heat exchanger between the liquid 1134 and the reservoir fluid 1118.

The illustrative inner tank 1130 includes an inlet line 1140 for receiving the exhaust or discharge from a liquid ring vacuum pump. The vacuum pump may expel some fluid in the exhaust or discharge. That is, if a liquid ring vacuum pump is used, the liquid used to form the outer seal ring of the vacuum pump may be gradually expelled from the pump though its exhaust. Thus, the exhaust that enters inner tank 1104 via inlet 1140 may contain a mixture of liquid, fluid, and air or other gas. Filings, dust, particles in the air taken in by the vacuum pump, and other sediments may also be included in the exhaust. Many of these sediments preferably settle out in inner tank 1130.

The inner tank 1130 preferably includes a first outlet 1142, a second outlet 1144, and a third outlet 1146. The first outlet 1142 is preferably connected to a liquid feeder line of the vacuum pump for providing liquid to the liquid ring vacuum pump, sometimes through a filter. The second outlet 1144 is shown connected to a spigot or valve 1162. Sediment 1136 that settles near the second outlet 1144 may be selectively flushed out of inner tank 1130 by opening the spigot or valve 1162, or a clean out plate if desired.

It is contemplated that valve 1162 may be any of several types, and may be adapted to connect to second outlet 1144 in several ways. Opening of valve 1162 expels fluid 1134 along with sediment 1136 from the inner tank 1104. It is contemplated that valve 1162 may be opened manually, or by mechanical or electronic actuation. Sometimes, the valve 1162 is opened after a passage of an interval of time, or in response to a signal from a sensor.

For example, one or more sensors could be disposed near first outlet 1142, along bottom 1143, near second outlet 1144, or at some other location to sense the amount of sediment 1136 contained in inner tank 1104. Alternatively, or in addition, one or more sensors could be disposed in or near a filter that filters liquid passing through first outlet 1142 (for example, filter 1262 shown in FIG. 36) for sensing an amount of sediment present in liquid 1134. Alternatively, or in addition, a sensor may be included for measuring the amount of pressure required to move liquid 1134 through first outlet 1142 or a filter disposed near first outlet 1142 (again, for example, filter 1262 shown in FIG. 36). When one of these sensors indicates that it is time to flush the sediment 1136 from the inner tank 1130, valve 1162 may be opened.

In some embodiments, the base 1132 and/or sides of inner tank 1130 may be configured to encourage the sediment to settle in an area near second outlet 1144. In the illustrative embodiment, the base 1132 slopes down from the first outlet 1142 to the second outlet 1144. However, other shapes may be used, depending on the application, to encourage sediment to collect near the second outlet 1144.

The third outlet 1146 is preferably positioned above the expected fluid or liquid level in the inner tank 1130, and provides a release to atmosphere of the exhaust gases provided to the inner tank 1130 via inlet line 1140. The inner tank 1104 preferably encourages many of the solids mixed with the air or gas exhausted by the vacuum pump to drop out and remain in the inner tank 1104, while air, gas and remaining dust particles may be expelled from the inner tank 1104 via third outlet 1146.

The third outlet 1146 may include a muffler 1150. In some embodiments, the muffler 1150 includes a series of baffles 1152 and an outlet nozzle or port 1154. In some embodiments, second outlet 1144 and third outlet 1146 are in fluid communication outside of the reservoir tank 1102 or separate from the inner tank 1104. Such a configuration may be useful, for example, to provide easy monitoring of the liquid level 1158 in the inner tank 1130 by an operator of the pump.

The muffler 1150 may have a cap 1156. Cap 1156 may be used, for example, to add additional liquid into inner tank 1130. Cap 1156 may also prove useful for monitoring properties of the liquid 1134 and/or for adding additives such as solvents, anti-freeze, cleansers, or other chemicals to the liquid 1134 as desired. For example, a pump may be used in an environment where a liquid inlet to the vacuum pump, which connects to the first outlet 1142, may be subject to extreme cold temperatures and become susceptible to ice blockage. In such an illustrative scenario, it may be desirable to add an anti-freeze solution to liquid 1134 via cap 1156. A filter 1159 may be provided as shown to help, for example, filter out contaminates in the liquid that is added to the inner tank 1130 via the cap 1156.

As detailed below with respect to FIG. 36, in some embodiments, the inner tank 1130 may receive additional or supplemental fluid from, for example, the main pump output. When so provided, it may be desirable to add chemicals via cap 1156 to liquid 1134 to, for example, prevent freezing of the liquid 1134, and/or to encourage precipitates to fall from liquid 1134, etc.

Figure 36:
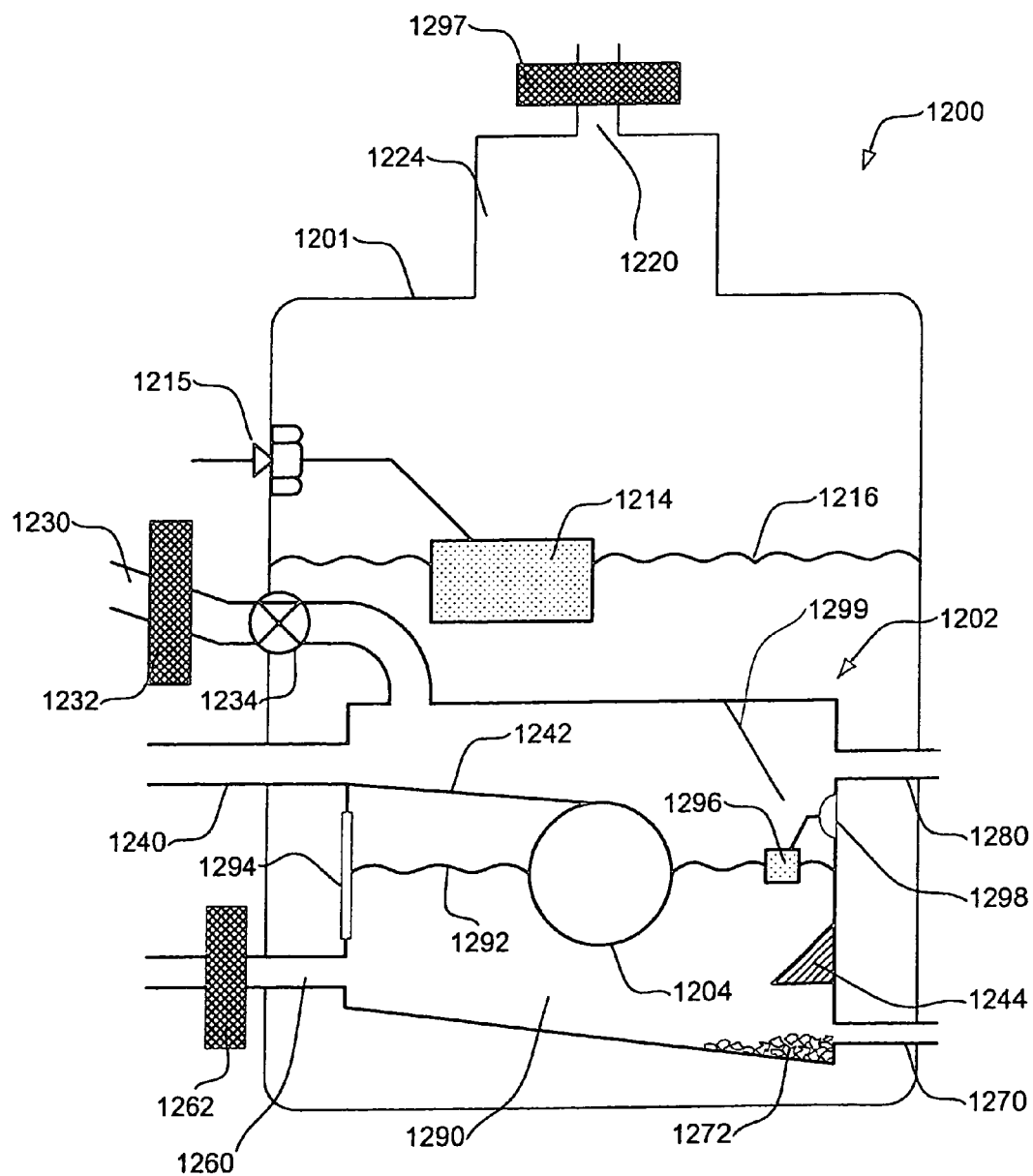
FIG. 36 is a schematic cross-sectional side view of another illustrative separator of the present invention.

FIG. 36 is a schematic cross-sectional side view of another illustrative separator of the present invention. Like FIG. 35, a separator 1200 is provided that includes a reservoir tank 1201, with an inner tank 1202 positioned inside reservoir tank 1201. Preferably, the inside cavity of the inner tank 1202 is fluidly isolated from the reservoir tank 1201. A cylindrical section 1204 may pass through inner tank 1202 to provide a passageway for the pumped fluid to flow from the main pump input 1036, through the separator 1200, and into the impeller and volute section 1034 (see FIG. 34) of the main pump.

The reservoir tank 1202 preferably includes an upper outlet 1220, which is in fluid communication with the inlet of a vacuum pump (not shown). As described above, the vacuum pump provides vacuum suction to the reservoir tank 1201 through upper outlet 1220 to raise the level of the reservoir fluid 1216 to prime the main pump 1030, at least under neutral or negative head pressures. The vacuum suction provided by the vacuum pump results in air flow from inside the reservoir tank 1201, through the upper outlet 1220, and to the vacuum pump. The cross-sectional area of the reservoir tank 1201 is typically larger than the cross-sectional area of the upper outlet 1220 and/or the line or tube connecting the upper outlet 1220 to the vacuum pump. Therefore, there can be a significant increase in velocity of air near the upper outlet 1220.

Because of vibration or movement of the pump, the fluid 1216 inside the reservoir tank 1201 may splash about, possibly causing some of the fluid 1216 to splash up toward upper outlet 1220. Some of this fluid may be sucked into the upper outlet 1220 and into the vacuum pump. In some cases, this can damage the vacuum pump, particularly when the fluid contains abrasives or other material. To help prevent this from occurring, an extension 1224 may be provided on top of the separator 1200. This extension 1224 may have a lateral cross-section that is less than the lateral cross-section of the reservoir 1201, but greater than the lateral cross-section of the upper outlet 1220. This extension 1224 may increase the distance between the fluid 1216 in the reservoir 1201 and the upper outlet 1220. Because the distance is increased, the amount of fluid that enters the inlet of the vacuum pump may be reduced. In addition, the extension 1224 may provide a transition in the air velocity as the air travels from the reservoir 1201 and into the upper outlet 1220.

A float 1214 or the like is preferably included in the reservoir tank 1201 to measure or detect the level of the reservoir fluid 1216 in the reservoir tank 1201. Other devices, including electronic sensors and/or mechanical or electro-mechanical sensors, may be used either in conjunction with or as substitute(s) for the float 1214. Under neutral or negative head pressures, float 1214 preferably controls a valve 1215, which selectively allows air into the reservoir tank 1201 when the reservoir fluid 1216 level exceeds a predetermined maximum level. For positive head pressures, valve 1215 is preferably a 1-way valve, as further explained below with reference to FIG. 37.

The illustrative inner tank 1202 includes an inlet line 1240 for receiving the exhaust from a liquid ring vacuum pump. The vacuum pump may expel some fluid in its exhaust; for example, if a liquid ring vacuum pump is used, the liquid used to form the outer seal ring of the vacuum pump may be gradually expelled from the pump though its exhaust. Thus, the exhaust that enters inner tank 1202 via inlet 1240 may contain a mixture of liquid, fluid, and air or other gas. Filings, dust, particles in the air taken in by the vacuum pump, and other sediments may also be included in the exhaust.

The inner tank 1202 preferably includes a first outlet 1260, a second outlet 1270, and a third outlet 1280, as shown. The first outlet 1260 is preferably connected to a liquid feeder line for the vacuum pump for providing liquid to the liquid ring vacuum pump, sometimes through a filter 1262. The second outlet 1270 is preferably connected to a spigot or valve, or clean out plate, as further described above with respect to FIG. 35. Sediment 1272 that settles near the second outlet 1270 may be selectively flushed out of inner tank 1202 by opening the spigot or valve, as desired.

To help reduce the amount of sediment collected by the vacuum pump, a filter 1297 may be provided in-line with the vacuum pump inlet. This filter 1297 may help prevent any sediment, dust or other undesirable particles from entering the vacuum pump. When so provided, the amount of sediment, dust or other undesirable particles that are exhausted by the vacuum pump into the inner tank 1202 may be greatly reduced.

In some embodiments, the inner tank 1202 may include various features to encourage sediment and contaminants to drop out of the liquid 1290 in the inner tank 1202. For example, and as discussed with reference to FIG. 35, it is contemplated that the base and/or sides of inner tank 1202 may be configured to encourage sediment to settle in an area near second outlet 1270. In the illustrative embodiment, the base slopes down from the first outlet 1260 to the second outlet 1270. This may help encourage sediments to settle near the second outlet 1270. Other shapes and configurations may be also be used, depending on the application.

Alternatively, or in addition, baffles or the like may be used to help direct fluid flow in the inner tank and to encourage settlement of sediments in the inner tank 1202. In the illustrative embodiment, a first baffle 1242 is provided for directing the exhaust coming through inlet 1240 across to the far side of the inner tank 1202. Other baffles may be disposed in various locations to help redirect the flow of the exhaust and to encourage more sediment to fall out. For example, a second baffle 1244 may be disposed near the second lower outlet 1270. The second baffle 1244 may direct fluid flow over the second outlet 1270 to encourage sediment to fall out while discouraging the disturbance of the settling or settled sediment 1272. Another baffle 1299 may also be provided. Baffle 1299 may help prevent water that is discharged from inlet 1240 from passing directly into the third outlet 1280. Other baffles may also be disposed in various locations and function similarly, depending on the application.

Finally, the third outlet 1280 is preferably positioned above the expected fluid or liquid level in the inner tank 1202, and provides a release to atmosphere of the exhaust gases provided to the inner tank 1202 by inlet line 1240.

Under some conditions, the fluid level in the inner tank 1202 may decrease over time. For example, in a low humidity environment, air enters the vacuum pump through the upper outlet 1220 of the reservoir tank 1201, exhausts into the inner tank 1202 via inlet 1240, and is expelled through the third outlet 1280 (and perhaps a subsequent muffler as shown for example, in FIG. 34 or 35). Due to the low ambient humidity, however, the air may retain a greater proportion of vapor upon being expelled than it contained when taken in by the vacuum pump. As more air circulates in this fashion, the amount of fluid 1290 available in the inner tank 1202 may become depleted.

To help maintain a proper fluid level in the inner tank 1202, it is contemplated that the inner tank 1202 may be selectively fluidly connected to a fluid source, such as the main pump output 1032 or some other fluid source. A feeder line 1230 with valve 1234 may be provided between the fluid source and the inner tank 1202. When connected, the fluid source may provide fluid, preferably under pressure, into the inner tank 1202 to replace the depleted fluid. A filter 1232 may also be provided to help prevent sediment from entering the inner tank 1202.

It is contemplated that one or more fluid level sensors may be disposed on or in inner tank 1202 to monitor or detect the level 1292 of liquid 1290 therein. The fluid level sensor may include, for example, float 1296 with float level sensor 1298, or other sensors 1294 such as temperature sensors, conductive sensors, optical sensors, pressure sensors or any other suitable sensor or sensors for sensing the fluid level in the inner tank 1202. Valve 1234 may be opened and closed manually, preferably at intervals, or in response to readings from the float 1296 and/or other sensors 1294. Alternatively, or in addition, valve 1234 may be opened and closed automatically when, for example, float 1296 and/or other sensors 1294 indicate the fluid level 1292 is below a predetermined minimum threshold.

In a very humid or warm climate, air taken in at a first humidity by a vacuum pump may be eventually expelled from third outlet 1280 of inner pump 1202 at a second, lower humidity. This may increase the amount and therefore the level 1292 of liquid 1290 in the inner tank 1202. To reduce the level 1292 of liquid 1290 in the inner tank 1202, a valve preferably on second outlet 1270 may be operated to open when float 1296 and/or sensors 1294 indicate that the level 1292 of liquid 1290 has exceeded some maximum predetermined level. Other factors, such as a leak in valve 1234 or a wall of inner tank 1202 may contribute to the raising and/or lowering of the level 1292 of liquid 1290.

Figure 37:
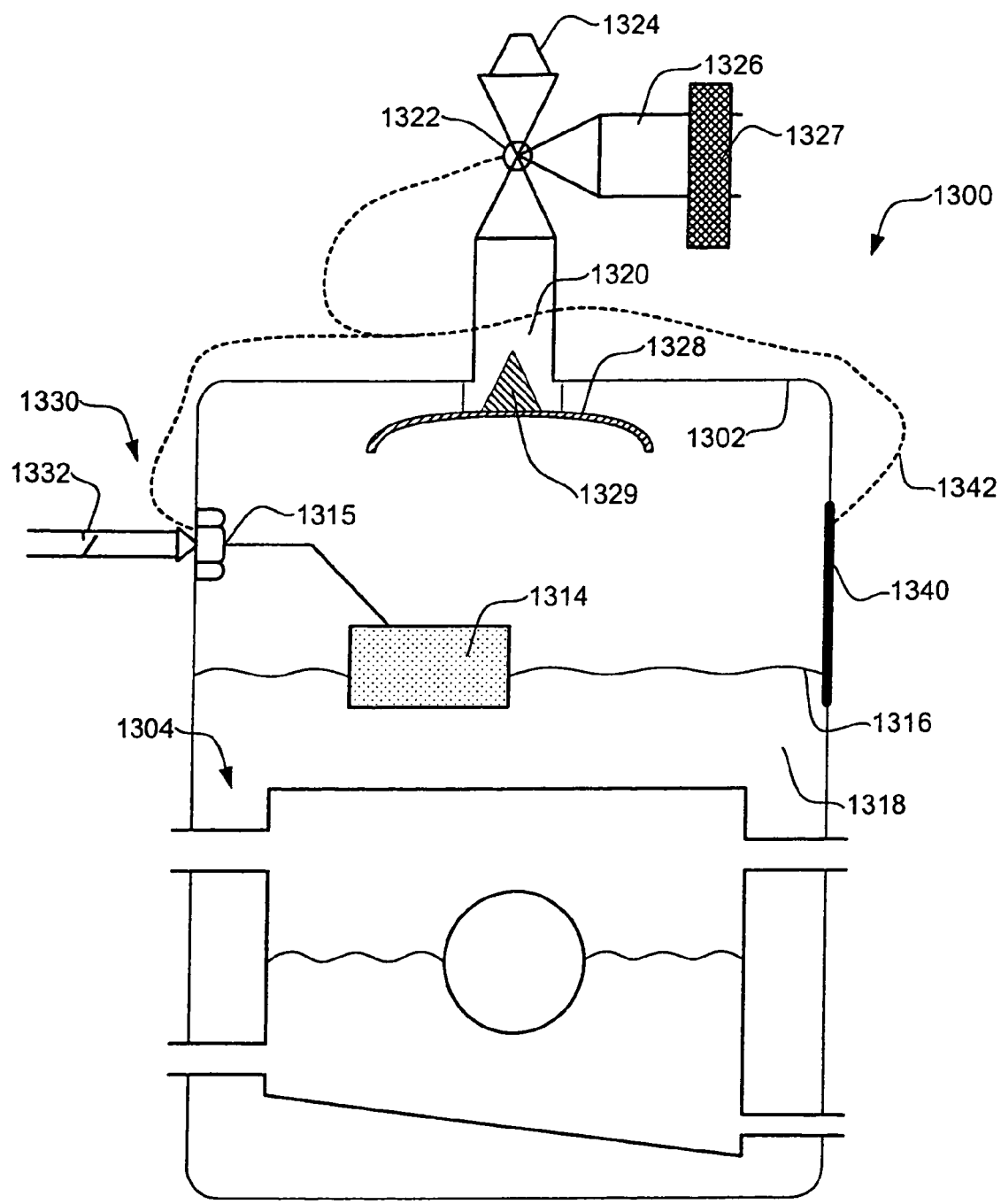
FIG. 37 is a schematic cross-sectional side view of another illustrative separator in accordance with the present invention.

FIG. 37 is a schematic cross-sectional side view of another illustrative separator in accordance with the present invention. This illustrative embodiment may be particularly suitable when operating under positive head pressures. A reservoir tank 1302 is provided that includes an upper outlet 1320, which is selectively in fluid communication with the inlet of a vacuum pump through a hose 1326 or the like. The vacuum pump provides vacuum suction to the reservoir tank 1302 through upper outlet 1320 to raise the level of the reservoir fluid 1316 to prime the main pump 1030, at least under neutral or negative head pressures.

A float 1314 or the like is included in the reservoir tank 1302 to measure or detect the level of the reservoir fluid 1316 in the reservoir tank 1302. Other devices, including electronic sensors and/or mechanical (e.g. another float) or electro-mechanical sensors 1340, maybe used either in conjunction with or as substitute(s) for the float 1314. Under neutral or negative head pressures, float 1314 preferably controls a valve 1315, which selectively allows air into the reservoir tank 1302 when the reservoir fluid 1316 level exceeds a predetermined maximum level.

Under some pumping conditions (such as with large positive head pressures), the vacuum pump may remove air from the reservoir tank 1302 faster than the pump can pump the fluid from the reservoir tank 1302. To help under these conditions, the size/capacity of the valve 1315 may be greater than or equal to the pumping capacity of the vacuum pump. In some cases, the size/capacity of the valve 1315 may be less than the pumping capacity of the vacuum pump, but large enough to make up for the difference between the pumping capacity of the vacuum pump and the amount of fluid that can be pumped by the pump from the reservoir tank 1302 under all anticipated head pressures.

A valve 1322 may also be provided between the upper outlet 1320 and the inlet 1326 of the vacuum pump. Under neutral or negative head pressures, the valve 1322 preferably connects the upper outlet 1320 to the inlet 1326 of the vacuum pump. The valve 1322 may be, for example, a three way valve as shown, two two-way valves, or any other suitable valve configuration.

Under positive head pressures, the fluid level in the reservoir tank 1302 may tend to rise, and in some circumstances, fill the reservoir tank 1302. To help prevent fluid leakage from the reservoir tank 1302, it is contemplated that the valve 1315 may be a one-way valve, as shown at 1332.

Valve 1315 may thus let air into the reservoir tank 1302 when the fluid level rises above a desired fluid level, to support operation under neutral or negative head pressures, but may not allow fluid out of the reservoir tank 1302 under positive head pressures. In addition, valve 1322 may close when the fluid level in the reservoir tank 1302 crosses some predefined maximum level. When the fluid level in the reservoir tank 1302 crosses the predefined maximum level, the valve 1322 may switch to connect the inlet 1326 of the vacuum pump to atmosphere, which may reduce the load on the vacuum pump. In some embodiments, the float 1314 may provide a signal to the valve 1322 via signal line 1342.

When the fluid level in the reservoir tank 1302 falls below the predefined maximum level, the valve 1322 may switch to connect the inlet 1326 of the vacuum pump to the reservoir tank 1302. Under some circumstances, a delay may be provided before the valve 1322 switches to connect the inlet 1326 of the vacuum pump to the reservoir tank 1302. This may help prevent the valve 1322 from constantly switching positions when the fluid level in the reservoir tank 1302 is at or near the predefined maximum level. Valve 1322 may help prevent leakage from the reservoir tank 1302 into the vacuum pump under positive head pressures. A filter 1327 or other device may be provided in line with the vacuum pump intake 1326 to help protect the vacuum pump from contaminants and/or other objects.

Under neutral or negative head pressures, the vacuum pump causes air to flow from the reservoir into the vacuum pump. It has been found that this airflow, along with vibration or movement of the pump, may cause the fluid inside the reservoir tank 1302 to splash or otherwise enter the upper outlet 1320, which may cause damage to the vacuum pump. In cold weather applications, this fluid may also dilute any antifreeze used in the vacuum pump system, which can reduce the reliability of the system.

To help prevent pumped fluid from entering the inlet of the vacuum pump, a deflector 1328 may be provided in the reservoir tank 1302, preferably between the upper outlet 1320 in the reservoir tank 1302 and the pumped fluid. The deflector 1328 is preferably adapted to help deflect or otherwise prevent the fluid in the reservoir tank 1302 from entering the upper outlet 1320 of the reservoir tank 1302, and hence from the intake of the vacuum pump.

The deflector 1328 may be a disk or other shape, and is preferably spaced below the upper outlet 1320. In one illustrative embodiment, the deflector 1328 is frisbee shaped, with the upper and lower surfaces both curving generally downward, as shown. This shape may help prevent fluid in the reservoir tank 1302 from entering the upper outlet 1320, and any fluid that reaches the top surface of the deflector may drain back into the reservoir. In some embodiments, a cone shaped member 1329 may also be provided to help direct the air into the upper outlet 1320, as shown. Preferably, the lateral dimensions of the deflector 1328 are larger than the lateral dimensions of the upper outlet 1320, but this is not required. It is also contemplated that the deflector 1328 may be used separately, or in combination with, the extension 1224 of FIG. 36.

Figure 38:
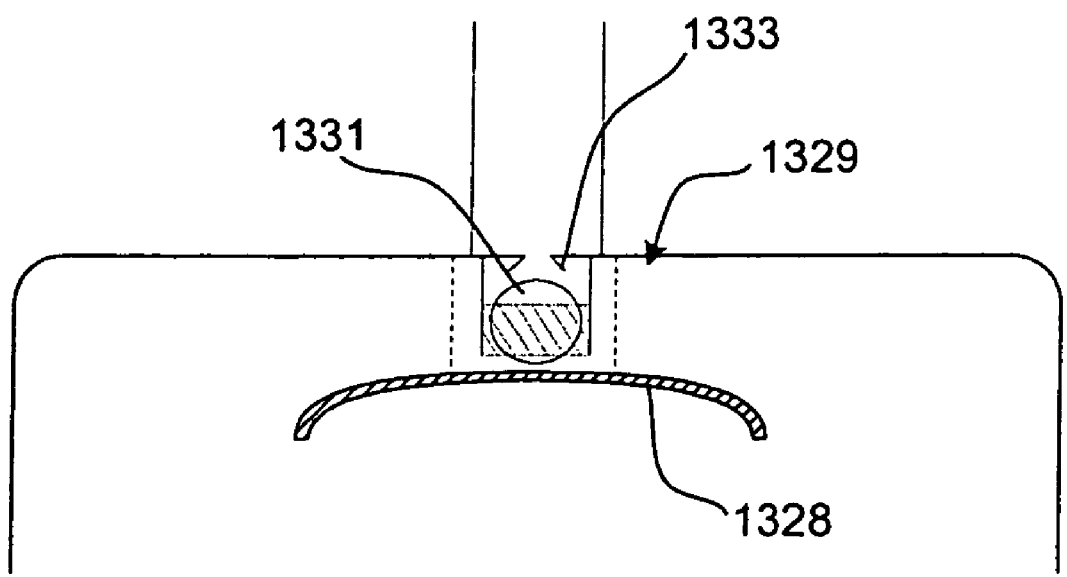
FIG. 38 is a schematic cross-sectional side view of a check value in accordance with the present invention.

Under positive head pressures, it is contemplated that the deflector 1328 may be adapted to act as a float so that, when the fluid level 1316 rises to the level of the deflector 1328, the deflector 1328 floats up to cover and seal off the upper outlet 1320 and/or mechanically switch the valve 1322. Alternatively, a check valve 1329 having a floating ball 1331 and a corresponding seat 1333 maybe provided above the deflector 1328, as shown in FIG. 38.

Alternatively, or in addition, valve 1322 may be controlled by electronic sensors and/or mechanical or electromechanical sensors 1340, if desired. A signal line 1342 may be provided between the sensor 1340 and the valve 1322. Valve 1322 may provide relief to the vacuum pump, such as by fluidly connecting the inlet of the vacuum pump to atmosphere when the upper outlet 1320 is closed. In one embodiment, valve 1322 is positioned at the vacuum pump inlet, and is a spring activated to fluidly connect the inlet of the vacuum pump to atmosphere when the pressure at the inlet of the vacuum pump reaches a predetermined level.

Having thus described the preferred embodiments of the present invention, those of skill in the art will readily appreciate that the teachings found herein may be applied to yet other embodiments within the scope of the claims hereto attached.

What is claimed is:

1. A separator tank for a main pump, the separator tank comprising:
   a main inlet for receiving pump fluid for the pump;
   a main outlet for providing pump fluid to the pump;
   a reservoir for accommodating pump fluid between the main inlet and the main outlet;
   an air port in fluid communication with the reservoir, the air port positioned above an expected level of the pump fluid in the reservoir;
   a valve having a first position and a second position, the first position fluidly connecting the air port to a vacuum pump and the second position fluidly connecting the vacuum pump to atmosphere; and
   a sensor for sensing a level of pump fluid in the reservoir, the sensor providing an electrical signal that provides an indication of the level of pump fluid in the reservoir, the electrical signal used, at least in part, to control the position of the valve.

2. A separator tank for a main pump, the separator tank comprising:
   a main inlet for receiving pump fluid for the pump;
   a main outlet for providing pump fluid to the pump;
   a reservoir having an interior for accommodating pump fluid between the main inlet and the main outlet;
   a first air port in fluid communication with the interior of the reservoir, the first air port positioned above an expected level of the pump fluid in the reservoir;
   a second air port in fluid communication with the interior of the reservoir, the second air port positioned above the expected level of the pump fluid in the reservoir;
   a first valve coupled to the first air port for selectively fluidly coupling the first air port to a vacuum pump;
   a second valve coupled to the second air port for selectively fluidly coupling the second air port to atmosphere; and
   a sensor for sensing a level of pump fluid in the reservoir, the sensor providing an electrical signal that provides an indication of the level of pump fluid in the reservoir which is used, at least in part, to control the first valve.

3. A separator tank according to claim 2 wherein the sensor is an electro-mechanical sensor.

4. A separator tank according to claim 2 wherein the sensor is a temperature sensor.

5. A separator tank according to claim 2 wherein the sensor is a conductivity sensor.

6. A separator tank according to claim 2 wherein the sensor is a pressure sensor.

7. A separator tank according to claim 2 wherein the sensor is an optical sensor.

8. A separator tank according to claim 2 wherein the sensor is provided along a side wall of the reservoir.

9. A separator tank according to claim 2 wherein the sensor is provided adjacent a side wall of the reservoir.

10. A separator tank according to claim 2 wherein the sensor includes a float.

11. A separator tank according to claim 2 wherein the sensor provides an electrical signal that indicates if the level of pump fluid in the reservoir exceeds a predetermined level or not.

12. A separator tank according to claim 2 wherein the sensor provides an electrical signal that indicates a level of pump fluid in the reservoir along a range of levels.

13. A separator tank for a main pump, the separator tank comprising:
    a main inlet for receiving pump fluid for the pump;
    a main outlet for providing pump fluid to the pump;
    a reservoir for accommodating pump fluid between the main inlet and the main outlet;
    the reservoir having a main reservoir with a shoulder that extends to a main reservoir top, and a reservoir extension extending up from the main reservoir top, the reservoir extension positioned above an expected level of the pump fluid in the reservoir and having a substantially reduced cross-sectional area relative to the main reservoir; and
    an air port in fluid communication with the reservoir extension.

14. A separator tank according to claim 13 wherein the reservoir extension extends from the main reservoir top in an upward direction.

15. A separator tank according to claim 14 wherein the air port is positioned at the top of the reservoir extension.

16. A separator tank according to claim 13 wherein the air port is at least selectively in fluid communication with a vacuum pump.

17. A separator tank according to claim 13 further comprising a deflector positioned adjacent to, but spaced from, the air port, the deflector for deflecting pump fluid that is directed at the air port.

18. A pump comprising:
    a separator tank having a main inlet for receiving pump fluid for the pump, a main outlet for providing pump fluid to the pump, a reservoir for accommodating pump fluid between the main inlet and the main outlet, an air port in fluid communication with the reservoir, the air port positioned above an expected level of the pump fluid in the reservoir, and a sensor for sensing a level of pump fluid in the reservoir, the sensor providing an electrical signal that provides an indication of the level of pump fluid in the reservoir;
    a vacuum pump for providing a vacuum;
    a valve having a first position and a second position, the first position fluidly connecting the vacuum pump to the air port of the reservoir and the second position fluidly connecting the vacuum pump to atmosphere; and
    a controller coupled to the sensor and the valve, the controller providing a delay after the sensor senses a level of pump fluid in the reservoir before switching the valve from the first position to the second position and/or between the second position to the first position.

19. The pump of claim 18 wherein the controller provides a delay after the sensor senses a first predetermined level of pump fluid in the reservoir before switching the valve from the first position to the second position.

20. The pump of claim 19 wherein the controller provides a delay after the sensor senses a second predetermined level of pump fluid in the reservoir before switching the valve from the second position to the first position.

21. The pump of claim 20 wherein the first predetermined level is higher than the second predetermined level.

* * * * *